(12) United States Patent
Kondo

(10) Patent No.: US 9,253,355 B2
(45) Date of Patent: Feb. 2, 2016

(54) COMMUNICATION APPARATUS THAT REDUCES POWER CONSUMPTION, METHOD OF CONTROLLING THE SAME, AND STORAGE MEDIUM

(71) Applicant: CANON KABUSHIKI KAISHA, Tokyo (JP)

(72) Inventor: Yuichi Kondo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/098,834

(22) Filed: Dec. 6, 2013

(65) Prior Publication Data
US 2014/0160509 A1    Jun. 12, 2014

(30) Foreign Application Priority Data
Dec. 7, 2012    (JP) .................................. 2012-268232

(51) Int. Cl.
G06F 3/12     (2006.01)
H04N 1/00    (2006.01)
H04N 1/32    (2006.01)
G06K 15/00  (2006.01)

(52) U.S. Cl.
CPC ....... *H04N 1/00899* (2013.01); *H04N 1/00954* (2013.01); *H04N 1/32379* (2013.01); *H04N 1/32635* (2013.01); *H04N 1/32673* (2013.01)

(58) Field of Classification Search
CPC .......... H04N 1/00899; H04N 1/00954; H04N 1/32379; H04N 1/32635; H04N 1/00885; H04N 1/2369; H04N 1/00896; H04N 220/0082; H04N 1/32673; G03G 15/205; G03G 15/5004; G03G 15/5075; G03G 21/02
USPC ............ 358/1.1, 1.4, 1.5, 1.6, 1.9, 1.11, 1.12, 358/1.14, 1.15, 1.16, 1.17, 1.18; 32/1.1, 32/1.4, 1.5, 1.6, 1.9, 1.11, 1.12, 1.14, 1.15, 32/1.16, 1.17, 1.18
See application file for complete search history.

(56) References Cited

U.S. PATENT DOCUMENTS

2008/0089709 A1\* 4/2008 Higashi ........................... 399/79
2012/0050792 A1\* 3/2012 Uozumi ....................... 358/1.15

FOREIGN PATENT DOCUMENTS

JP    06-237349 A    8/1994
JP    2009-047760 A    3/2009

\* cited by examiner

*Primary Examiner* — Thierry L Pham
(74) *Attorney, Agent, or Firm* — Rossi, Kimms & McDowell LLP

(57) ABSTRACT

A communication apparatus that reduces electric power consumption. A communication apparatus includes a storage section for storing an image received by fax. Power rate information indicative of a time period during which a power rate is high is acquired. A forced memory reception time period during which an image received by fax is not immediately printed but stored in the storage section is set based on the acquired power rate information. When an image is received by fax during the forced memory reception time period, the image received by fax is stored in the storage section. The image stored in the storage section is printed at a time other than the forced memory reception time period.

8 Claims, 22 Drawing Sheets

FIG.5

■POWER RATE INFORMATION

| ELECTRIC POWER COMPANY | TIME | POWER RATE (YEN/kWh) | | STANDARD RATE (YEN/kWh) |
|---|---|---|---|---|
| | | SUMMERTIME | OTHER SEASONS | |
| ELECTRIC POWER COMPANY A | 07:00 - 10:00 | 22 | 22 | 22 |
| | 10:00 - 17:00 | 31 | 28 | |
| | 17:00 - 23:00 | 22 | 22 | |
| | 23:00 - 07:00 (NEXT DAY) | 8 | 8 | |
| ELECTRIC POWER COMPANY B | 07:00 - 13:00 | 27 | 27 | 27 |
| | 13:00 - 16:00 | 45 | 27 | |
| | 16:00 - 23:00 | 27 | 27 | |
| | 23:00 - 07:00 (NEXT DAY) | 9 | 9 | |
| ...... | | | | |

FIG.6

| FAX NUMBER | INSTALLATION LOCATION | ELECTRIC POWER COMPANY | MEMORY RECEPTION-SET TIME PERIOD |
|---|---|---|---|
| 001-1111 | OFFICE A | ELECTRIC POWER COMPANY A | 07:00 - 23:00 |
| 001-0002 | OFFICE A | ELECTRIC POWER COMPANY A | 07:00 - 23:00 |
| 002-0001 | OFFICE B | ELECTRIC POWER COMPANY B | 10:00 - 17:00 |
| 002-0002 | OFFICE B | ELECTRIC POWER COMPANY B | 10:00 - 17:00 |
| 03-0001-00001 | OFFICE A | ELECTRIC POWER COMPANY A | 17:00 - 06:00 (NEXT DAY) |
| 03-0002-00001 | OFFICE B | ELECTRIC POWER COMPANY B | NO SETTING |

FIG.14A

| MEMORY RECEPTION SETTING |
|---|
| <FINALIZE> |
| AUTOMATIC TIME SETTING BY MANAGEMENT SERVER |
| TIME SETTING BASED ON MEMORY RECEPTION-RECOMMENDED TIME |
| TIME SETTING BASED ON RECEPTION PRINT-RECOMMENDED TIME |

FIG.14B

| MEMORY RECEPTION TIME |
|---|
| RECOMMENDED TIME FROM START TO END |
| 07:00 - 23:00 |

FIG.14C

| MEMORY RECEPTION SETTING |
|---|
| <FINALIZE> |
| AUTOMATIC TIME SETTING BY MANAGEMENT SERVER |
| TIME SETTING BASED ON MEMORY RECEPTION-RECOMMENDED TIME |
| TIME SETTING BASED ON RECEPTION PRINT-RECOMMENDED TIME |

FIG.14D

| TIME SETTING BASED ON MEMORY RECEPTION-RECOMMENDED TIME |
|---|
| RECOMMENDED TIME FROM START TO END |
| 10:00 - 17:00 |
| CHANGE MEMORY RECEPTION TIME |

FIG.14E

| MEMORY RECEPTION SETTING |
|---|
| <FINALIZE> |
| AUTOMATIC TIME SETTING BY MANAGEMENT SERVER |
| TIME SETTING BASED ON MEMORY RECEPTION-RECOMMENDED TIME |
| TIME SETTING BASED ON RECEPTION PRINT-RECOMMENDED TIME |

FIG.14F

| TIME SETTING BASED ON RECEPTION PRINT-RECOMMENDED TIME |
|---|
| RECOMMENDED TIME FROM START TO END |
| 23:00 - 07:00(NEXT DAY) |
| CHANGE RECEPTION PRINT TIME |

COMMUNICATION APPARATUS THAT REDUCES POWER CONSUMPTION, METHOD OF CONTROLLING THE SAME, AND STORAGE MEDIUM

BACKGROUND OF THE INVENTION

1. Field of the Invention

The present invention relates to a communication apparatus that reduces power consumption, a method of controlling the same, and a storage medium.

2. Description of the Related Art

Conventionally, there has been proposed an image forming apparatus that determines whether to execute a job or wait by comparing a power rate costing to execute the job and a predetermined acceptable power rate based on electricity unit price information to thereby execute the job when the power rate is relatively low (see e.g. Japanese Patent Laid-Open Publication No. 2009-47760).

Further, as a facsimile machine, there has been proposed one configured to be capable of setting a plurality of pairs of start times and end times for forced memory reception during a day to thereby set a plurality of forced memory reception-enabled time periods and forced memory reception-canceled time periods, during a day, as desired (see e.g. Japanese Patent Laid-Open Publication No. H06-237349).

However, in the technique disclosed in Japanese Patent Laid-Open Publication No. 2009-47760, to calculate a power rate costing to execute a job, for example, it is necessary to prepare a table of electric power amounts which are used for various operations of an image reading section, an image forming section, and so on, on a sheet size-by-sheet size basis or on a sheet feeder-by-sheet feeder basis.

Further, in the technique disclosed in Japanese Patent Laid-Open Publication No. H06-237349, it is necessary to check with an electric power company for whether or not power rates have been revised, and correct and set the start times and end times for forced memory reception to lower-power rate time periods whenever the power rates have been revised.

Further, in the conventional facsimile machine, when performing facsimile transmission, even when it is during a time period during which the power rate is low at a transmitting end, it is not necessarily during a time period during which the power rate is low at a receiving end.

SUMMARY OF THE INVENTION

The present invention provides a communication apparatus that reduces electric power consumption, a method of controlling the same, and a storage medium.

Accordingly, in a first aspect of the present invention, there is provided a communication apparatus including a storage section for storing an image received by facsimile, comprising an acquisition unit configured to acquire power rate information indicative of a time period during which a power rate is high, a setting unit configured to set a forced memory reception time period based on the power rate information acquired by the acquisition unit, during which an image received by facsimile is not printed but stored in the storage section, a storing unit configured to store, in a case where an image is received by facsimile during the forced memory reception time period set by the setting unit, the image received by facsimile in the storage section, and a printing unit configured to print the image stored in the storage section at a time other than the forced memory reception time period.

Accordingly, in a second aspect of the present invention, there is provided a communication apparatus comprising a first acquisition unit configured, in a case where a facsimile is transmitted, to acquire power rate information which indicates a plurality of power rates, time periods to which the plurality of power rates are applied, respectively, and a standard power rate which is a power rate used as a reference, and is applied to a destination communication apparatus which is a receiver of the facsimile, a second acquisition unit configured to acquire a memory reception time period which is a time period during which when a facsimile is received by the destination communication apparatus, the facsimile is not printed but stored in a storage section, a first determination unit configured to determine whether or not the current time is included in a high power rate time period during which the power rate is higher than the standard power rate, using the power rate information acquired by the first acquisition unit, a second determination unit configured to determine whether or not the current time is included in the memory reception time period acquired by the second acquisition unit, and a transmission unit configured to transmit a facsimile after an end of the high power rate time period, when it is determined by the first determination unit that the current time is included in the high power rate time period and also it is determined by the second determination unit that the current time is not included in the memory reception time period.

Accordingly, in a third aspect of the present invention, there is provided a method of controlling a communication apparatus including a storage section for storing an image received by facsimile, comprising acquiring power rate information indicative of a time period during which a power rate is high, setting a forced memory reception time period based on the power rate information acquired by the acquiring, during which an image received by facsimile is not printed but stored in the storage section, storing, in a case where an image is received by facsimile during the forced memory reception time period set by the setting, the image received by facsimile in the storage section, and printing the image stored in the storage section at a time other than the forced memory reception time period.

Accordingly, in a fourth aspect of the present invention, there is provided a method of controlling a communication apparatus, comprising acquiring, in a case where a facsimile is transmitted, power rate information which indicates a plurality of power rates, time periods to which the plurality of power rates are applied, respectively, and a standard power rate which is a power rate used as a reference, and is applied to a destination communication apparatus which is a receiver of the facsimile, acquiring a memory reception time period which is a time period during which when a facsimile is received by the destination communication apparatus, the facsimile is not printed but stored in a storage section, determining whether or not the current time is included in a high power rate time period during which the power rate is higher than the standard power rate, using the power rate information acquired by the first-mentioned acquiring, determining whether or not the current time is included in the memory reception time period acquired by the second-mentioned acquiring, and transmitting a facsimile after an end of the high power rate time period, when it is determined by the first-mentioned determining that the current time is included in the high power rate time period and also it is determined by the second-mentioned determining that the current time is not included in the memory reception time period.

Accordingly, in a fifth aspect of the present invention, there is provided a non-transitory computer-readable storage medium storing a computer-executable program for causing a computer to execute a method of controlling a communication apparatus including a storage section for storing an image received by facsimile, wherein the method comprises acquiring power rate information indicative of a time period during which a power rate is high, setting a forced memory reception time period based on the power rate information acquired by the acquiring, during which an image received by facsimile is not printed but stored in the storage section, storing, in a case where an image is received by facsimile during the forced memory reception time period set by the setting, the image received by facsimile in the storage section, and printing the image stored in the storage section at a time other than the forced memory reception time period.

Accordingly, in a sixth aspect of the present invention, there is provided a non-transitory computer-readable storage medium storing a computer-executable program for causing a computer to execute a method of controlling a communication apparatus, wherein the method comprises acquiring, in a case where a facsimile is transmitted, power rate information which indicates a plurality of power rates, time periods to which the plurality of power rates are applied, respectively, and a standard power rate which is a power rate used as a reference, and is applied to a destination communication apparatus which is a receiver of the facsimile, acquiring a memory reception time period which is a time period during which when a facsimile is received by the destination communication apparatus, the facsimile is not printed but stored in a storage section, determining whether or not the current time is included in a high power rate time period during which the power rate is higher than the standard power rate, using the power rate information acquired by the first-mentioned acquiring, determining whether or not the current time is included in the memory reception time period acquired by the second-mentioned acquiring, and transmitting a facsimile after an end of the high power rate time period, when it is determined by the first-mentioned determining that the current time is included in the high power rate time period and also it is determined by the second-mentioned determining that the current time is not included in the memory reception time period.

According to the present invention, it is possible to provide a communication apparatus that reduces electric power consumption, a method of controlling the same, and a storage medium.

Further features of the present invention will become apparent from the following description of exemplary embodiments with reference to the attached drawings.

BRIEF DESCRIPTION OF THE DRAWINGS

FIG. 5 is a diagram showing time-of-day-based electricity unit price information.

FIG. 6 is a diagram showing communication apparatus information managed by the power rate management server.

FIG. 14A is a diagram showing an example of a screen displayed on an operation panel of the communication apparatus.

FIG. 14B is a diagram showing an example of a screen displayed on the operation panel of the communication apparatus.

FIG. 14C is a diagram showing an example of a screen displayed on the operation panel of the communication apparatus.

FIG. 14D is a diagram showing an example of a screen displayed on the operation panel of the communication apparatus.

FIG. 14E is a diagram showing an example of a screen displayed on the operation panel of the communication apparatus.

FIG. 14F is a diagram showing an example of a screen displayed on the operation panel of the communication apparatus.

DESCRIPTION OF THE EMBODIMENTS

The present invention will now be described in detail below with reference to the drawings showing an embodiment thereof.

Figure 1:
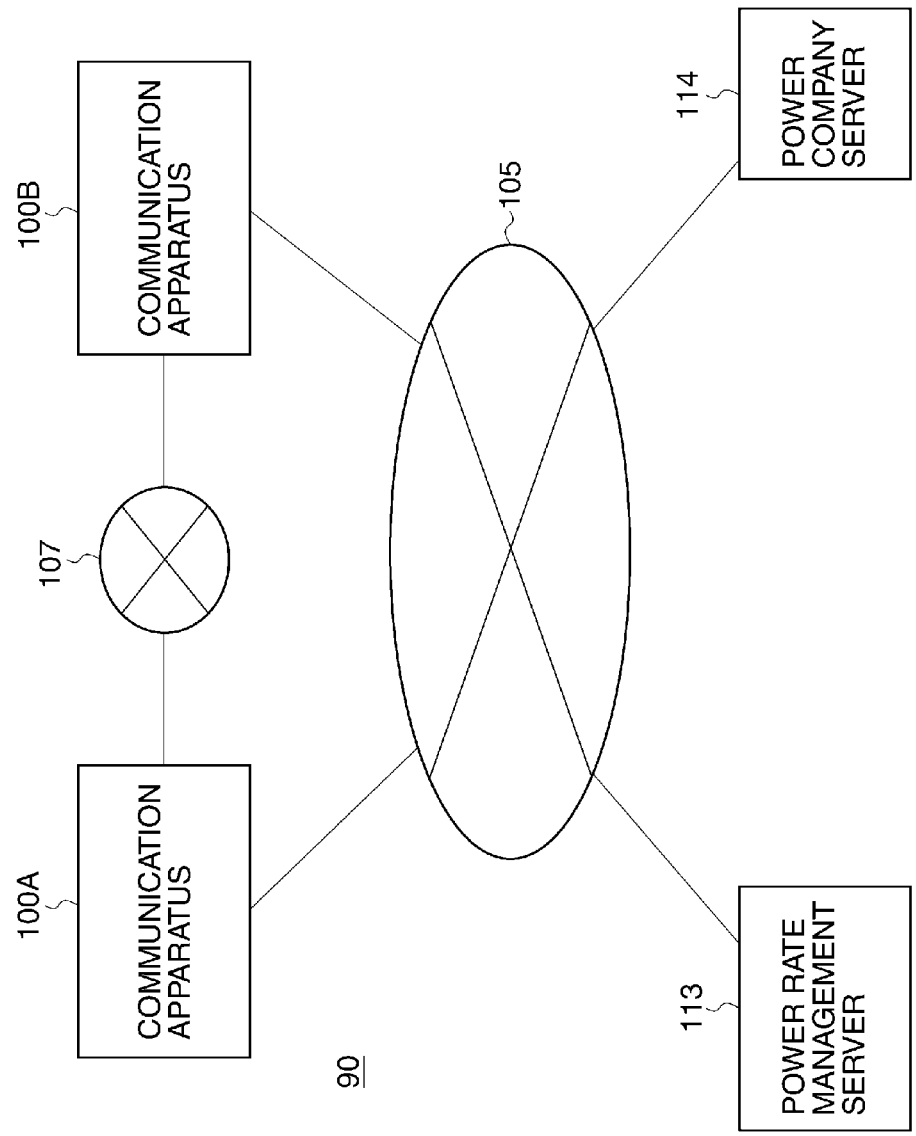
FIG. 1 is a diagram of system configuration of a communication system according to an embodiment of the present invention.

FIG. 1 is a diagram of system configuration of a communication system 90 according to an embodiment of the present invention.

Referring to FIG. 1, the communication system 90 includes communication apparatuses 100A and 100B, a power rate management server 113, and a power company server 114.

The communication apparatuses 100A and 100B are each connected to a public telephone line 107 and a network 105, and facsimile communication can be performed between the communication apparatuses 100A and 100B. Further, the communication apparatuses 100A and 100B can communicate with the power rate management server 113.

Further, the power rate management server 113 and the power company server 114 are each connected to the network 105, and can communicate with each other.

Hereinafter, when the communication apparatuses 100A and 100B are not distinguished from each other, they are each referred to as the communication apparatus 100. Further, although the two communication apparatuses, one power rate management server, and one power company server are illustrated in FIG. 1 by way of example, the number of apparatuses is not limited to this.

Figure 2:
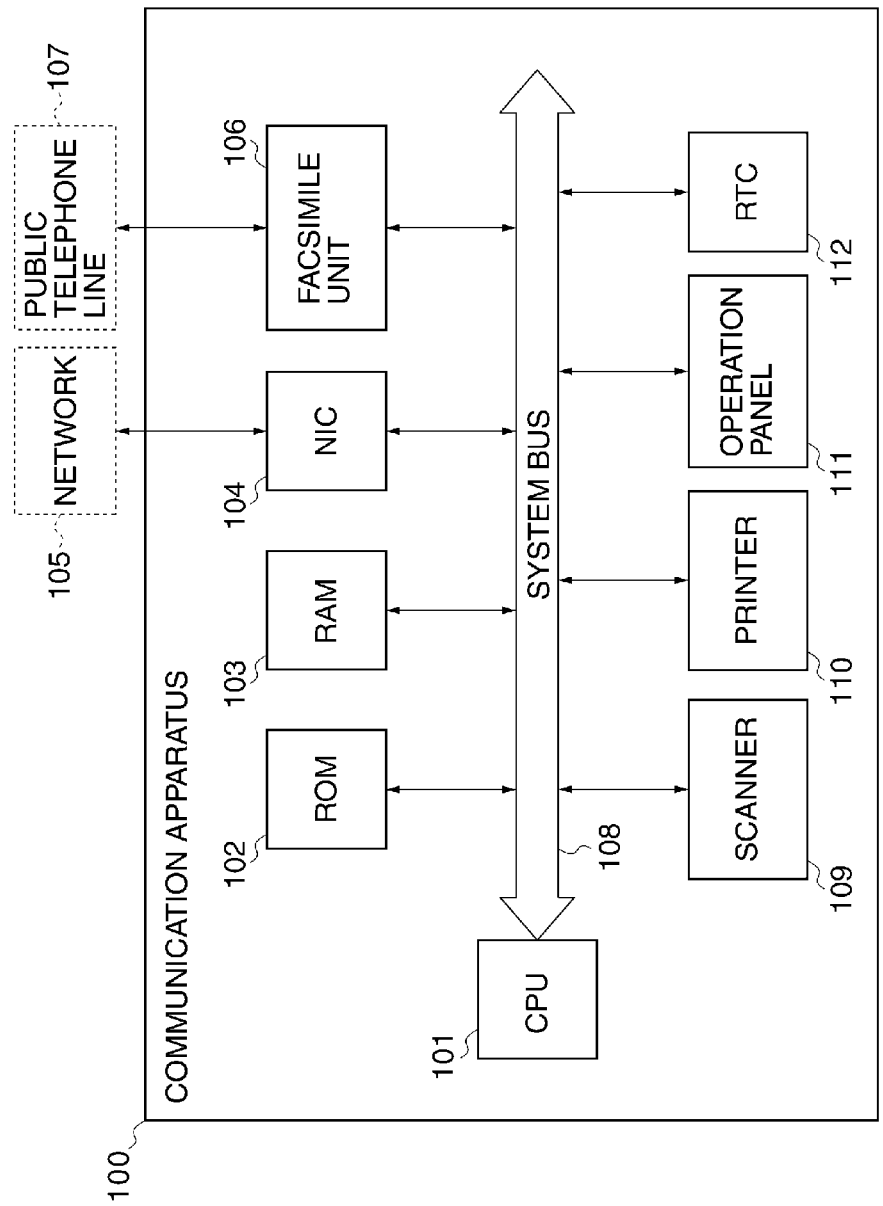
FIG. 2 is a schematic block diagram of a communication apparatus appearing in FIG. 1.

FIG. 2 is a schematic block diagram of the communication apparatus 100 appearing in FIG. 1.

Referring to FIG. 2, the communication apparatus 100 includes a CPU 101 that executes software stored in a ROM 102. The CPU 101 performs centralized control of operations of the devices connected to a system bus 108.

The ROM 102 is a nonvolatile memory storing software programs for executing a data communication process, a power rate management configuration process, a power rate information acquisition process, a memory reception-setting process, a destination setting process, and so on. The ROM 102 further stores device data of the communication apparatus 100, used for power rate management configuration, memory reception setting, destination setting, and so on.

A RAM 103 is a volatile memory which is used as a main memory and a work memory for the CPU 101, and a storage section for temporarily storing data of data transmission destinations, data transmission formats, and the like. An operation panel 111 includes various keys and buttons for designating a destination, and a touch panel, and further includes a display module composed of a liquid crystal display, LEDs, and so on.

An NIC (network interface card) 104 performs bi-directional data communication with a communication apparatus at a data transmission destination and an external server for temporarily storing data, via the network 105.

A printer 110 is a printing section implemented by an electrophotographic printer or the like. A scanner 109 generates image data by reading an original, and stores the generated image data in the RAM 103. A facsimile unit 106 is connected to the external public telephone line 107 for execution of facsimile communication.

The system bus 108 transfers signals between the CPU 101 and the respective blocks. An RTC (real time clock) 112 is a clock control section used for acquiring time information.

Figure 3:
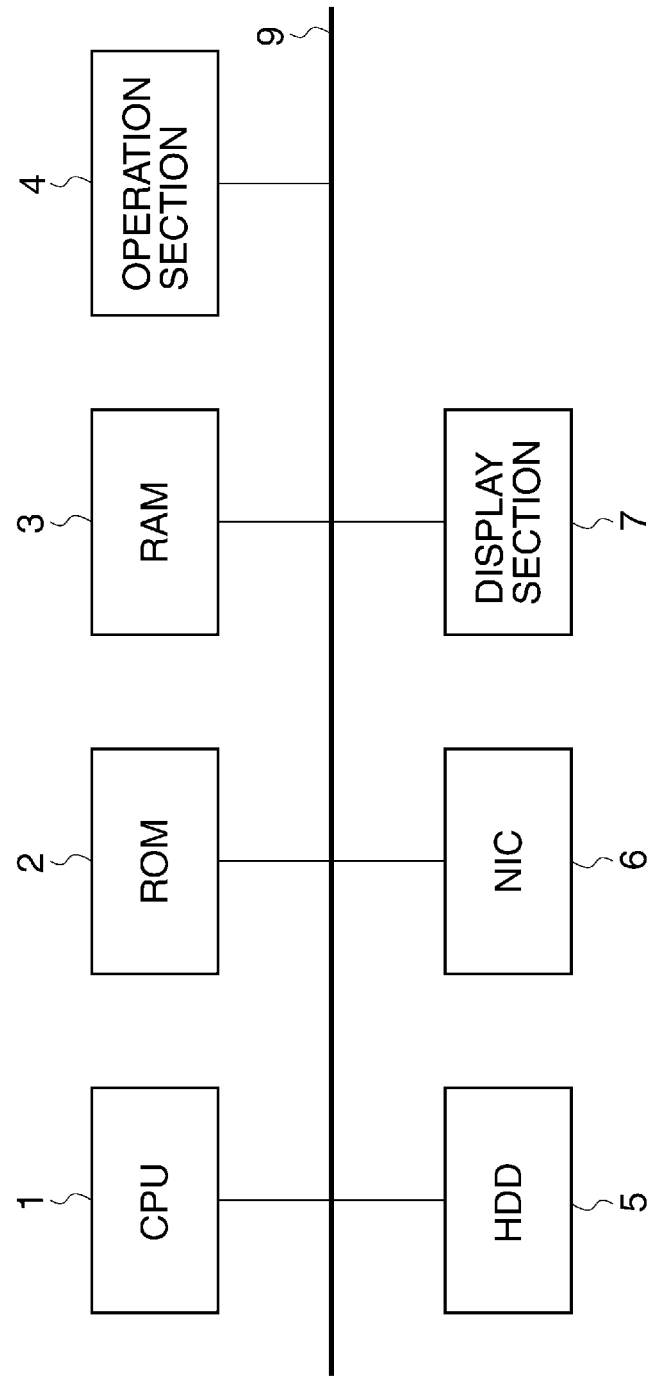
FIG. 3 is a schematic diagram of each of a power rate management server and a power company server.

FIG. 3 is a schematic block diagram of each of the power rate management server 113 and the power company server 114.

Referring to FIG. 3, the configuration of the power rate management server 113 and the power company server 114 will be described using the power rate management server 113. The power rate management server 113 includes a CPU 1, a ROM 2, a RAM 3, an operation section 4, an HDD 5, a NIC 6, and a display section 7, which are connected to each other via a bus 9.

The CPU 1 controls the overall operation of the power rate management server 113. The ROM 2 stores a boot program, etc. The RAM 3 is used as a work area for the CPU 1. The operation section 4 comprises a keyboard and a mouse.

The HDD 5 stores programs, etc., for executing processes, described hereinafter. The NIC 6 performs communication with other apparatuses via the network 105. The display section 7 is a display, such as an LCD.

Figure 4:
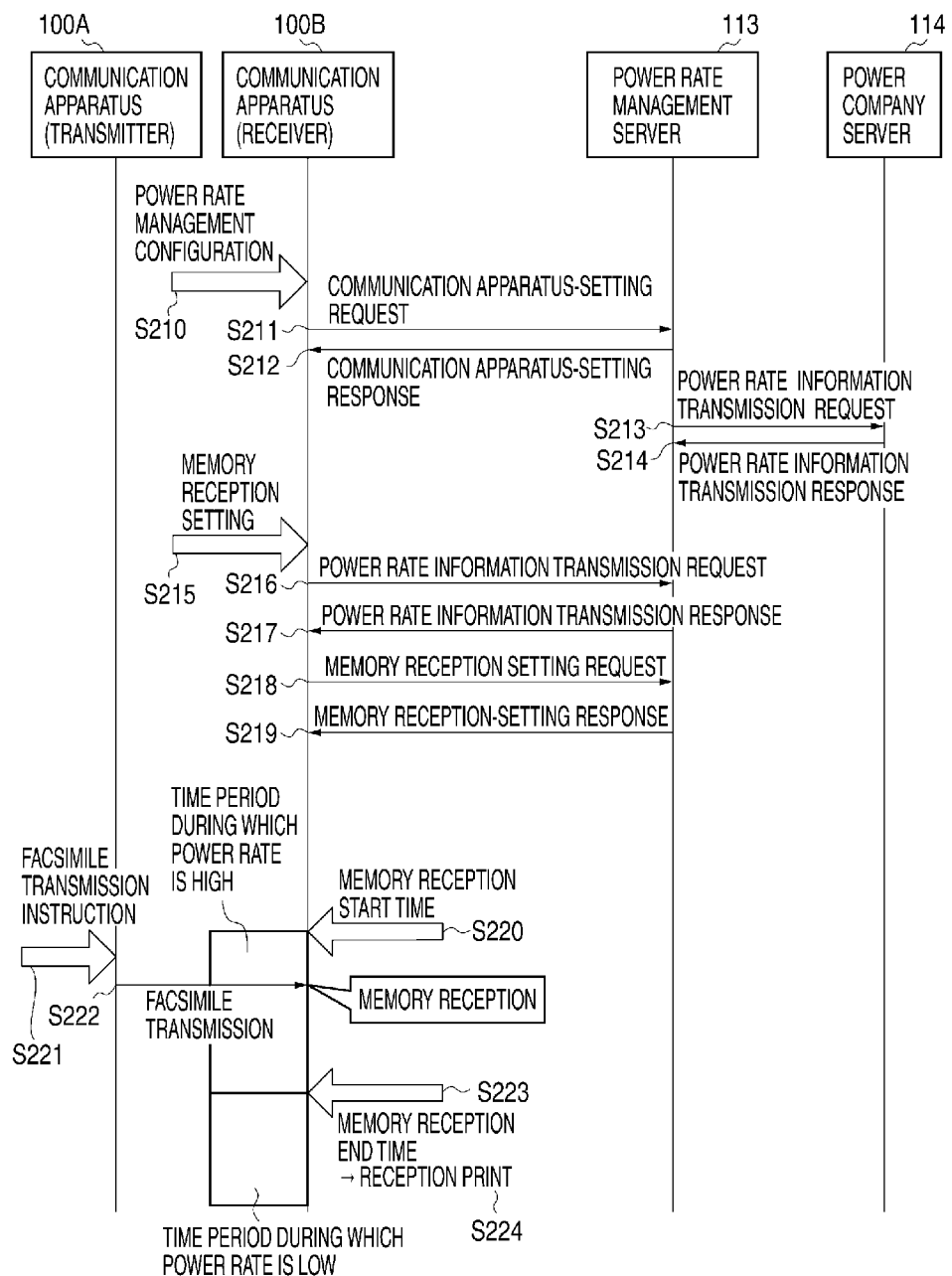
FIG. 4 is a sequence diagram of a facsimile transmission and reception process executed by the communication system.

FIG. 4 is a sequence diagram of a facsimile transmission and reception process executed by the communication system 90 shown in FIG. 1.

FIG. 4 shows an example of the facsimile transmission and reception process in a case where a facsimile is transmitted from the communication apparatus 100A to the communication apparatus 100B.

When the power rate management configuration is performed by inputting an address of the power rate management server 113 (step S210), the communication apparatus 100B transmits a communication apparatus-setting request to the power rate management server 113 via the network 105 (step S211).

A fax number and an installation location which have been set in the communication apparatus 100B in advance are sent to the power rate management server 113 by the communication apparatus-setting request.

Upon receipt of the communication apparatus-setting request, the power rate management server 113 stores the received fax number and installation location as the management information of the communication apparatus 100B, and sets the power company server 114 of an electric power company that manages a district including the received installation location, as a server to be used in association with the request.

Then, the power rate management server 113 sends a communication apparatus-setting response to the communication apparatus 100B (step S212). Next, the power rate management server 113 regularly sends a power rate information transmission request to the power company server 114 (step S213).

Upon receipt of the power rate information transmission request, the power company server 114 transmits time-of-day-based electricity unit price information to the power rate management server 113 as a power rate information transmission response (step S214). The time-of-day-based electricity unit price information will be described hereinafter.

Upon receipt of the time-of-day-based electricity unit price information, the power rate management server 113 updates time-of-day-based electricity unit prices, and sets standard rates as the power rate management information.

Next, when memory reception is designated for the communication apparatus 100B by a memory reception setting thereto (step S215), the communication apparatus 100B regularly sends a power rate information transmission request to the power rate management server 113 via the network 105 (step S216).

The above-mentioned memory reception setting is a setting for storing, when a facsimile is received, data in the PRA 103 without printing the data immediately after the receipt, and then printing the facsimile data when conditions for printing are satisfied.

Upon receipt of the power rate information transmission request, the power rate management server 113 transmits the time-of-day-based electricity unit price information to the communication apparatus 100B as a power rate information transmission response (step S217).

Then, upon receipt of the time-of-day-based electricity unit price information, the communication apparatus 100B sets times for the memory reception. When the times for the memory reception have been set, the communication apparatus 100B sends a memory reception-setting request to the power rate management server 113 via the network 105 (step S218).

Upon receipt of the memory reception-setting request, the power rate management server 113 updates memory reception setting information, and sends a memory reception-setting response to the communication apparatus 100B (step S219).

Next, when it is time to start the memory reception, which has been set as one of the times for the memory reception, the communication apparatus 100B shifts to a memory reception mode (step S220). For example, the start time of a time period during which the power rate is high is set as the start time of each of the times set for the memory reception.

Then, when a fax transmission instruction is provided to the communication apparatus 100A as a transmitter at a transmitting end (step S221), a facsimile is transmitted from the communication apparatus 100A to the communication apparatus 100B as a receiver at a receiving end (step S222).

The communication apparatus 100B as the receiver executes a memory reception process. The memory reception corresponds to an operation of a storing unit configured to store, when an image is received by fax during a forced memory reception time, described hereinafter, the image received by fax in the RAM 103.

Then, after the memory reception mode is terminated (step S223), the communication apparatus 100B as the receiver performs reception print for printing the facsimile data received during the memory reception mode (step S224). The end time of the time set for the memory reception is set e.g. to the end time of the time period during which the power rate is high.

FIG. 5 is a diagram showing the time-of-day-based electricity unit price information.

Referring to FIG. 5, the time-of-day-based electricity unit price information corresponds to power rate information, and is composed of items of electric power company, time period, power rate, and standard rate.

The electric power company is information for identifying an electric power company. The time period indicates a time period to which each power rate is applied. The power rate is information on power rates which are separately set for summertime and the other time, and values in respective boxes indicate power rates for the respective seasons and time periods. The standard rate is a rate set by each electric power company as a reference. Thus, the time-of-day-based electricity unit price information includes a plurality of power rates, time periods to which the plurality of power rates are applied, respectively, and a standard power rate, which is a power rate serving as a reference.

FIG. 6 is a diagram showing communication apparatus information managed by the power rate management server 113.

The communication apparatus information shown in FIG. 6 is information indicative of contents received in response to the memory reception-setting request sent in the step S218.

The communication apparatus information is composed of items of fax number, installation location, electric power company, and memory reception-set time period.

The fax number indicates a fax number of a communication apparatus. The installation location indicates a location where the communication apparatus is installed. The electric power company indicates an electric power company which manages a district including the installation location of the communication apparatus.

The memory reception-set time period indicates a time period during which the communication apparatus receives a facsimile by the memory reception function. For example, the memory reception-set time period "07:00-23:00" indicates that a facsimile is received by the memory reception function from 7 a.m. to 11 p.m., and in a case where no time is set as the memory reception-set time period, "no setting" is entered.

Figure 7:
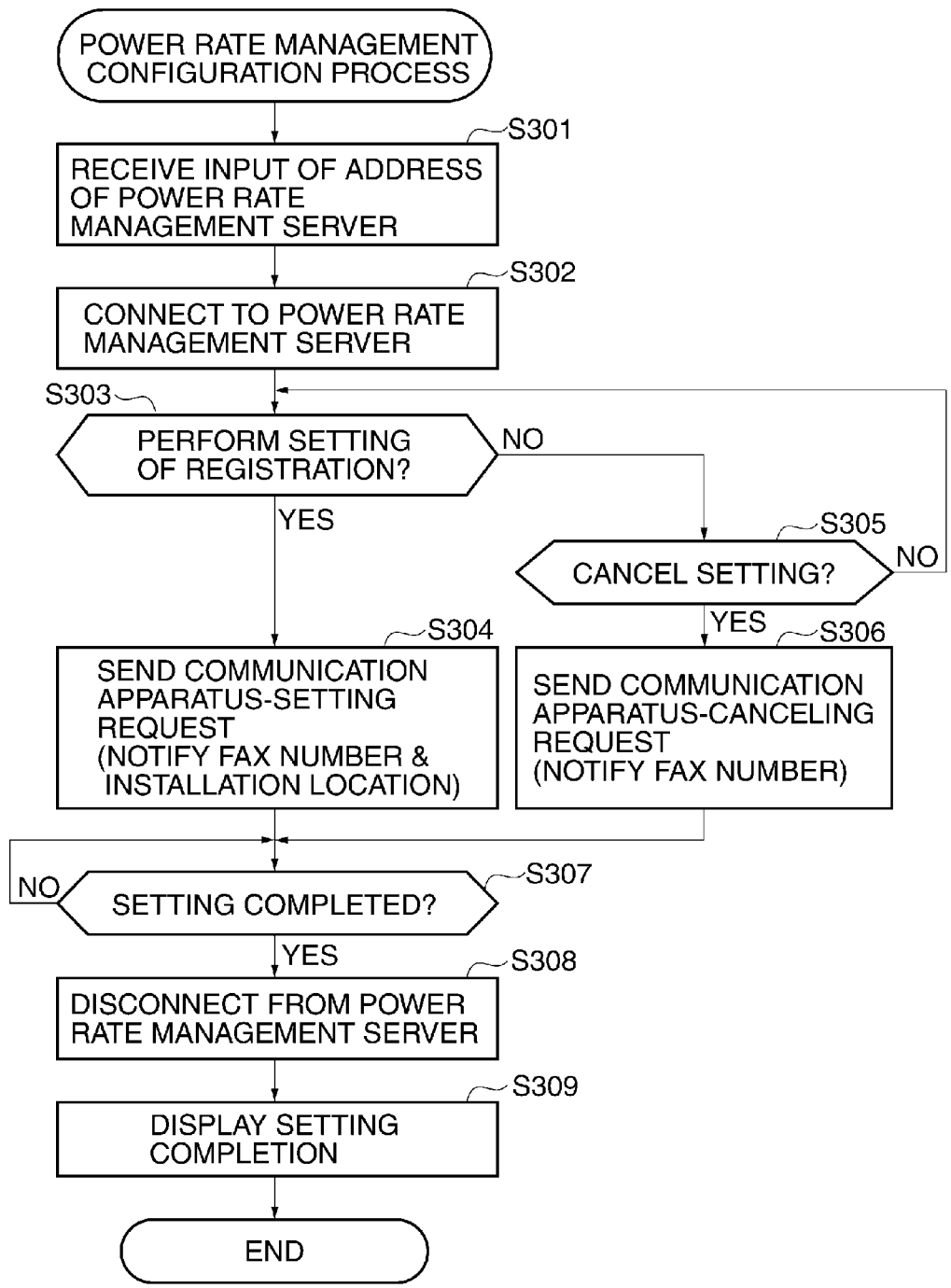
FIG. 7 is a flowchart of a power rate management configuration process executed by a CPU of the communication apparatus.

FIG. 7 is a flowchart of a power rate management configuration process executed by the CPU 101 of the communication apparatus.

The power rate management configuration process in FIG. 7 is assumed to be executed by the communication apparatus 100B in this example, and corresponds to the steps S211 and S212 in FIG. 4.

Upon receipt of input of the address of the power rate management server 113 (step S301), the communication apparatus 100B connects to the power rate management server 113 (step S302), and determines whether or not to set registration of the self apparatus with the power rate management server 113 (step S303).

If it is determined in the step S303 that the registration of the self apparatus with the power rate management server 113 is to be set (YES to the step S303), the communication apparatus 100B sends a communication apparatus-setting request to the power rate management server 113 (step S304), and proceeds to a step S307. The communication apparatus 100B transmits the fax number and the installation location, which have been set in the communication apparatus 100B in advance, to the power rate management server 113 by the communication apparatus-setting request.

On the other hand, if it is determined in the step S303 that the registration of the self apparatus with the power rate management server 113 is not to be set (NO to the step S303), the communication apparatus 100B determines whether or not to set cancellation of the registration (step S305). If it is determined in the step S305 that the cancellation of the registration is not to be set (NO to the step S305), the communication apparatus 100B returns to the step S303.

On the other hand, if it is determined in the step S305 that the cancellation of the registration is to be set (YES to the step S305), the communication apparatus 100B sends a request to the power rate management server 113 for canceling the registration of the communication apparatus 100B (step S306), and proceeds to the step S307. The communication apparatus 100B transmits the fax number, which has been set in the communication apparatus 100B in advance, by the canceling request.

Next, when the setting in the power rate management server 113 is completed (YES to the step S307), the communication apparatus 100B disconnects from the power rate management server 113 (step S308), and displays completion of the setting on the operation panel 111 (step S309), followed by terminating the present process.

In the step S307, in a case where the communication apparatus-setting request has been sent, the setting of registration of the communication apparatus 10B is determined to be completed when the communication apparatus 100B receives a communication apparatus-setting response. Further, in a case where the canceling request has been sent, the setting of cancellation of registration of the communication apparatus 10B is determined to be completed when the communication apparatus 100B receives a cancel response.

Figure 8:
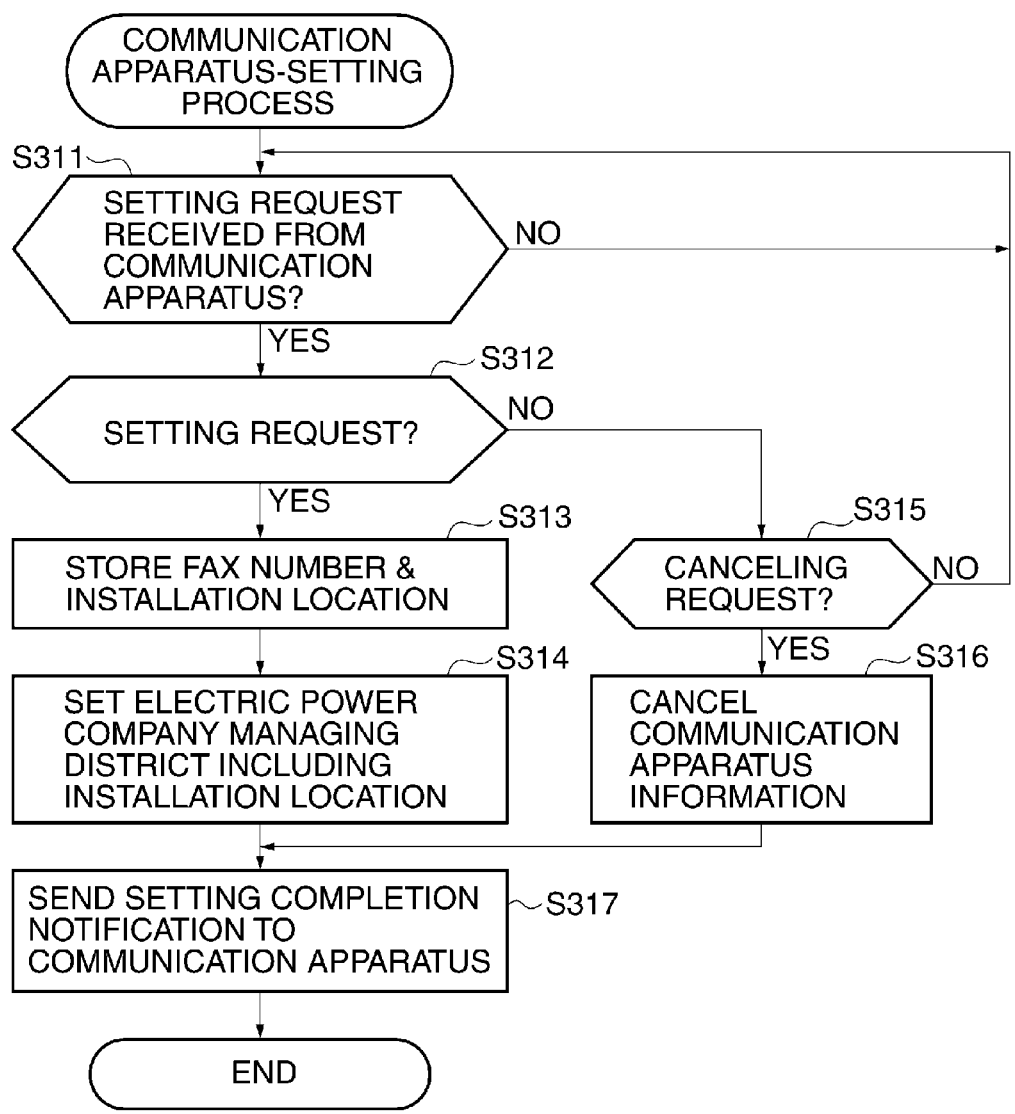
FIG. 8 is a flowchart of a communication apparatus-setting process executed by a CPU of the power rate management server.

FIG. 8 is a flowchart of the communication apparatus-setting process executed by the CPU 1 of the power rate management server 113.

The communication apparatus-setting process in FIG. 8 is performed in association with the power rate management configuration process in FIG. 7.

Referring to FIG. 8, when a setting request of either a communication apparatus-setting request or cancellation setting request, mentioned above, is received from the communication apparatus 100 (YES to a step S311), the power rate management server 113 determines whether or not the setting request is a communication apparatus-setting request (step S312).

If it is determined in the step S312 that the setting request is a communication apparatus-setting request (YES to the step S312), the power rate management server 113 stores the fax number and the installation location of the communication apparatus information described with reference to FIG. 6 (step S313).

Then, the power rate management server 113 sets the electric power company which manages a district including the received installation location in the communication apparatus information (step S314), and sends a setting completion notification to the communication apparatus (step S317), followed by terminating the present process. Note that the electric power company may be identified based on the fax number.

On the other hand, if it is determined in the step S312 that the setting request is not a communication apparatus-setting request (NO to the step S312), the power rate management server 113 determines whether or not the setting request is a canceling request (step S315). If it is determined in the step S315 that the setting request is not a canceling request (NO to the step S315), the power rate management server 113 returns to the step S311.

On the other hand, if it is determined in the step S315 that the setting request is a canceling request (YES to the step S315), since the canceling request includes a fax number, the power rate management server 113 deletes the communication apparatus information associated with the fax number (step S316), and proceeds to the step S317.

As the setting completion notification sent in the step S317, a communication apparatus-setting response is sent in a case where the communication apparatus-setting request has been received, and a cancel response is sent in a case where the canceling request has been received.

Figure 9:
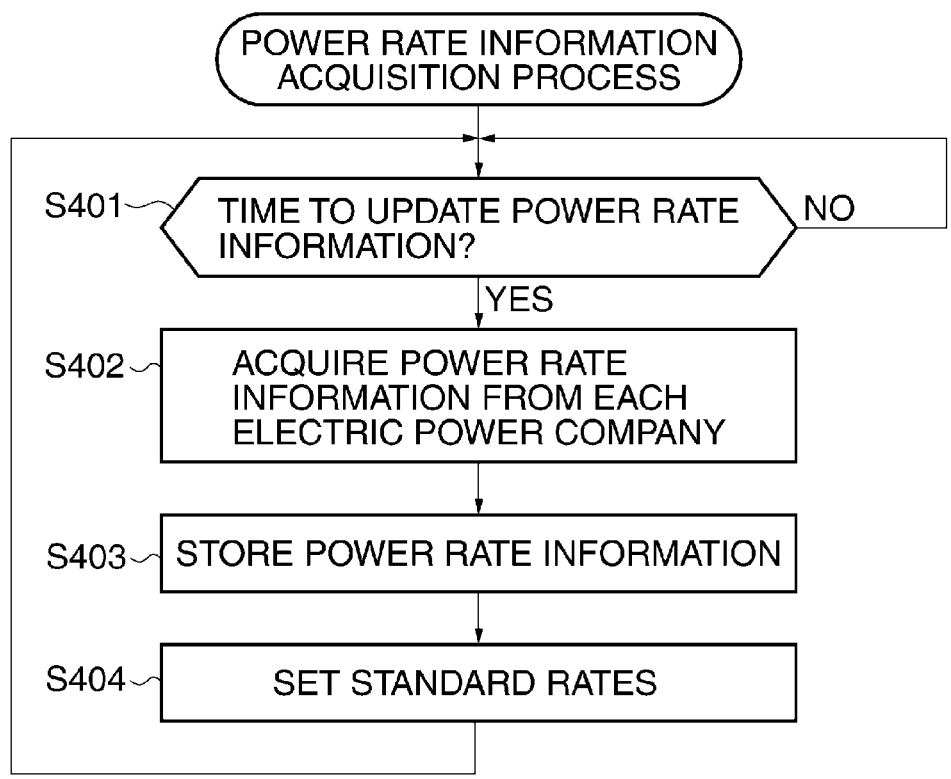
FIG. 9 is a flowchart of a power rate information acquisition process executed by the CPU of the power rate management server.

FIG. 9 is a flowchart of the power rate information acquisition process executed by the CPU 1 of the power rate management server 113.

The power rate information acquisition process corresponds to the steps S213 and S214 in FIG. 4.

Referring to FIG. 9, when it is time to update the power rate information (YES to a step S401), the power rate management server 113 acquires the power rate information from each electric power company (step S402). Then, the power rate management server 113 stores the power rate information including information described with reference to FIG. 5, such as the time-of-day-based electricity unit price information acquired from each electric company, and the date and time of next update (step S403). Then, the power rate management server 113 sets the standard power rates (step S404), and returns to the step S401.

Figure 10:
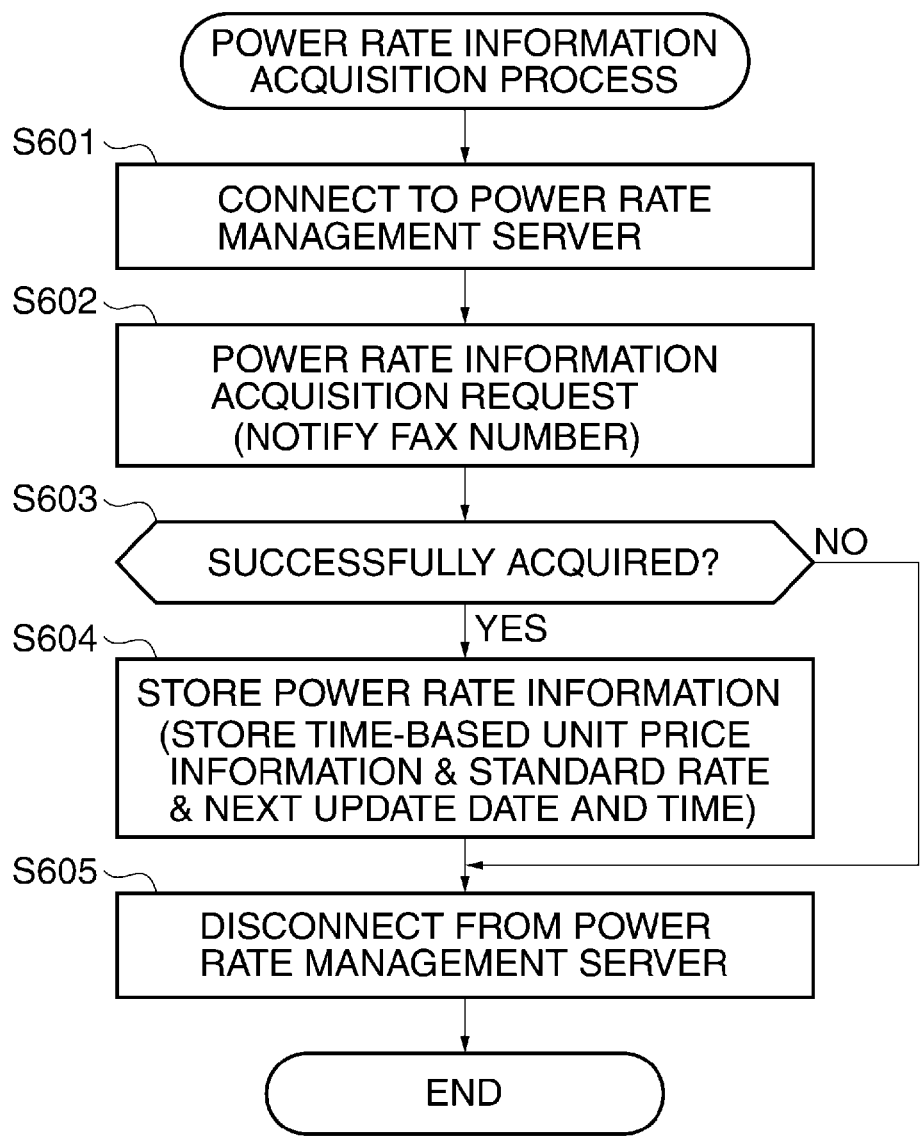
FIG. 10 is a flowchart of a power rate information acquisition process executed by the CPU of the communication apparatus.

FIG. 10 is a flowchart of the power rate information acquisition process executed by the CPU 101 of the communication apparatus.

Referring to FIG. 10, the communication apparatus 100B connects to the power rate management server 113 (step S601), and sends a power rate information acquisition request to the power rate management server 113 (step S602). At this time, the communication apparatus 100B sends the fax number set in the communication apparatus 100B in advance.

Then, the communication apparatus 100B determines whether or not the power rate information has been successfully acquired (step S603). If it is determined in the step S603 that the power rate information has not been successfully acquired (NO to the step S603), the communication apparatus 100B proceeds to a step S605. Cases of unsuccessful acquisition of power rate information include a case where an error notification is received from the power rate management server 113 and a case where no response is received.

On the other hand, if it is determined in the step S603 that the power rate information has been successfully acquired (YES to the step S603), the communication apparatus 100B stores the time-of-day-based electricity unit price information, the standard rate, the date and time of next update, etc., which have been acquired from the power rate management server 113, as the power rate information (step S604). Then, the communication apparatus 100B disconnects from the power rate management server 113 (step S605), followed by terminating the present process.

Figure 11:
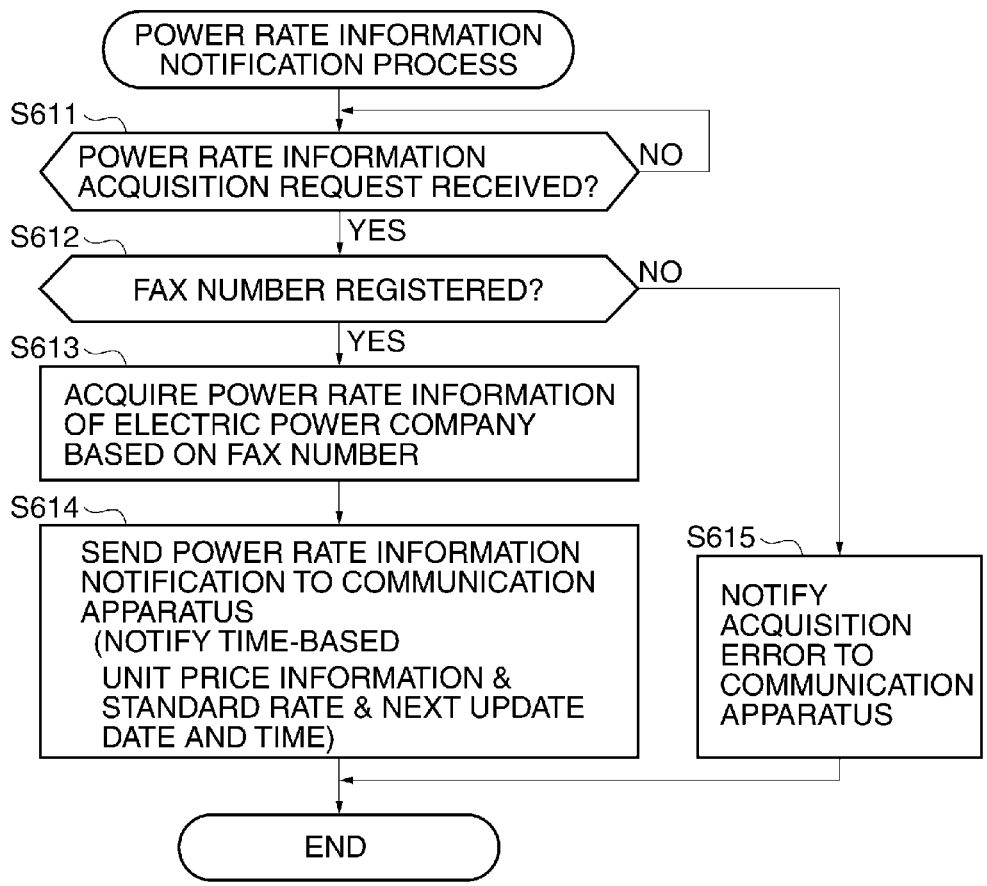
FIG. 11 is a flowchart of a power rate information notification process executed by the CPU of the power rate management server.

FIG. 11 is a flowchart of a power rate information notification process executed by the CPU 1 of the power rate management server 113.

Referring to FIG. 11, upon receipt of a power rate information transmission request from the communication apparatus 100B (YES to a step S611), the power rate management server 113 determines whether or not the fax number of the communication apparatus 1000B which is a sender of the request has been registered in the communication apparatus information managed by the power rate management server 113 (step S612).

If it is determined in the step S612 that the fax number of the communication apparatus 100B which is the sender of the request has not been registered in the communication apparatus information (NO to the step S612), the power rate management server 113 sends an error notification to the communication apparatus 100B (step S615), followed by terminating the present process.

On the other hand, if it is determined in the step S612 that the fax number of the communication apparatus 100B which is the sender of the request has been registered in the communication apparatus information (NO to the step S612), the power rate management server 113 acquires the power rate information of the electric power company, based on the transmitted fax number (step S613).

Then, the power rate management server 113 transmits the power rate information of the acquired electric power company to the communication apparatus 100B which is the sender of the request (step S614), followed by terminating the present process. At this time, the power rate management server 113 sends the time-based unit price information, the standard rate, the date and time of next update, etc. as the power rate information.

Figure 12:
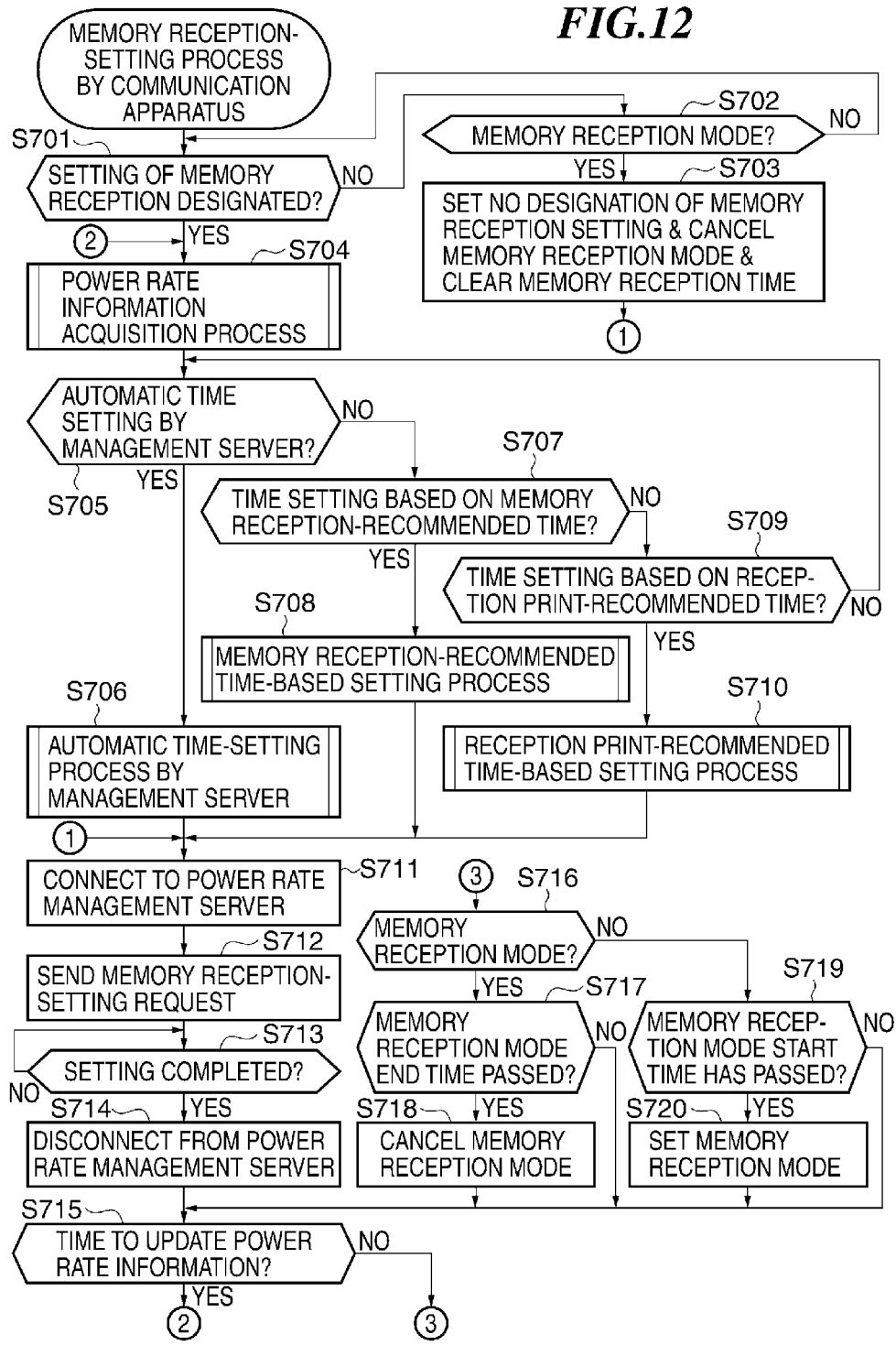
FIG. 12 is a flowchart of a memory reception-setting process executed by the CPU of the communication apparatus.

FIG. 12 is a flowchart of the memory reception-setting process executed by the CPU 101 of the communication apparatus.

The memory reception-setting process in FIG. 12 corresponds to the step S216 and subsequent steps in FIG. 4. Referring to FIG. 12, the communication apparatus 100B determines whether or not designation of the memory reception setting has been set (step S701).

If it is determined in the step S701 that designation of the memory reception setting has not been set (NO to the step S701), the communication apparatus 100B determines whether or not the current mode is the memory reception mode (step S702).

If it is determined in the step S702 that the current mode is not the memory reception mode (NO to the step S702), the communication apparatus 100B returns to the step S701. On the other hand, if it is determined in the step S702 that the current mode is the memory reception mode (YES to the step S702), the communication apparatus 100B cancels the memory reception mode by setting the memory reception setting to no designation, clears the memory reception-set time period (step S703), and proceeds to a step S711.

Referring again to the step S701, if it is determined in the step S701 that designation of the memory reception setting is set (YES to the step S701), the communication apparatus 100B executes the power rate information acquisition process shown in FIG. 10 to thereby acquire the power rate information (step S704).

Then, the communication apparatus 100B determines whether or not "automatic time setting by the power rate management server" has been selected for the setting of the start time and the end time of the memory reception (step S705).

If it is determined in the step S705 that "automatic time setting by the power rate management server" has been selected (YES to the step S705), the communication apparatus 100B performs an automatic time-setting process (step S706), described hereinafter, and proceeds to the step S711.

On the other hand, if it is determined in the step S705 that "automatic time setting by the power rate management server" has not been selected (NO to the step S705), the communication apparatus 100B determines whether or not "time setting based on the memory reception-recommended time" has been selected (step S707).

If it is determined in the step S707 that "time setting based on the memory reception-recommended time" has been selected (YES to the step S707), the communication apparatus 100B executes a memory reception-recommended time-based setting process (step S708), described hereinafter, and proceeds to the step S711.

On the other hand, if it is determined in the step S707 that "time setting based on the memory reception-recommended time" has not been selected (NO to the step S707), the communication apparatus 100B determines whether or not "time setting based on the reception print-recommended time" has been selected (step S709).

If it is determined in the step S709 that "time setting based on the reception print-recommended time" has been selected (YES to the step S709), the communication apparatus 100B executes a reception print-recommended time-based setting process (step S710), described hereinafter, and proceeds to the step S711.

On the other hand, if it is determined in the step S709 that "time setting based on the reception print-recommended time" has not been selected (NO to the step S709), the communication apparatus 100B returns to the step S705.

Then, the communication apparatus 100B connects to the power rate management server 113 (step S711), and sends a memory reception-setting request (step S712). The communication apparatus 100B sends the fax number and the memory reception time, which have been set in the communication apparatus 100B in advance, by the memory reception-setting request.

Then, when the setting in the power rate management server 113 is completed (YES to a step S713), the communication apparatus 100B disconnects from the power rate management server 113 (step S714), and determines whether or not it is time to update the power rate information (step S715).

If it is determined in the step S715 that it is time to update the power rate information (YES to the step S715), the communication apparatus 100B returns to the step S704. On the other hand, if it is determined in the step S715 that it is not time to update the power rate information (NO to the step S715), the communication apparatus 100B determines whether or not the current mode is the memory reception mode (step S716).

If it is determined in the step S716 that the current mode is the memory reception mode (YES to the step S716), the communication apparatus 100B determines whether or not the current time has passed the memory reception mode end time (step S717). If it is determined in the step S717 that the current time has not passed the memory reception mode end time (NO to the step S717), the communication apparatus 100B proceeds to the step S715.

On the other hand, if it is determined in the step S717 that the current time has passed the memory reception mode end time (YES to the step S717), the communication apparatus 100B cancels the memory reception mode (step S718), and proceeds to the step S715.

If it is determined in the step S716 that the current mode is not the memory reception mode (NO to the step S716), the communication apparatus 100B determines whether or not the current time has passed the memory reception mode start time (step S719).

If it is determined in the step S719 that the current time has not passed the memory reception mode start time (NO to the step S719), the communication apparatus 100B proceeds to the step S715.

On the other hand, if it is determined in the step S719 that the current time has passed the memory reception mode start time (YES to the step S719), the communication apparatus 100B sets the current mode to the memory reception mode (step S720), and proceeds to the step S715.

The above-described steps S706, S708, and S710 correspond to an operation of a setting unit configured to set a forced memory reception time period during which an image received by fax is stored in the RAM 103 without printing the image, based on the acquired power rate information. Printing can be executed during time other than the forced memory reception time, and hence the steps S706, S708, and S710 also correspond to an operation of the setting unit configured to set a printable time period during which an image stored in the RAM 103 can be printed, based on the acquired power rate information. The printable time period is a time period during which an image can be printed immediately after receiving the image.

Figure 13:
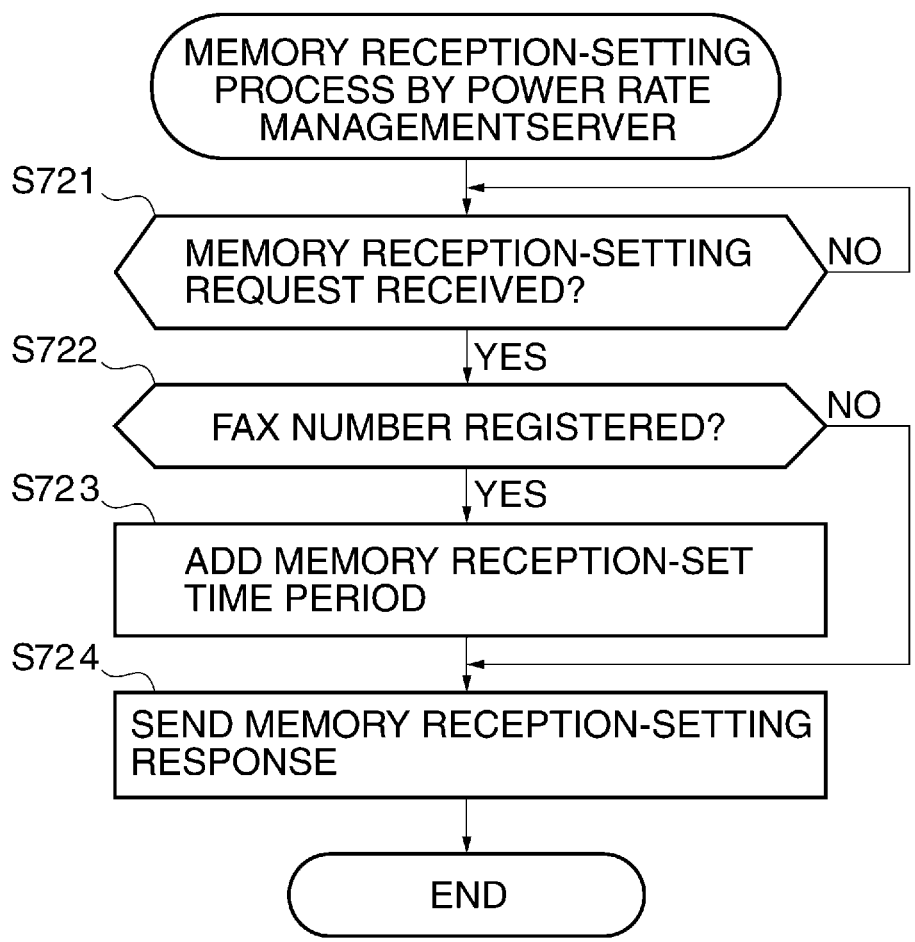
FIG. 13 is a flowchart of a memory reception-setting process executed by the CPU of the power rate management server.

FIG. 13 is a flowchart of the memory reception-setting process executed by the CPU 1 of the power rate management server 113.

The memory reception-setting process (power rate management server) in FIG. 13 is performed in association with the memory reception-setting process in FIG. 12.

Referring to FIG. 13, upon receipt of the memory reception setting from the communication apparatus 100B (YES to a step S721), the power rate management server 113 determines whether or not the fax number of the communication apparatus 100B which is the sender of the request has been registered in the communication apparatus information managed by the power rate management server 113 (step S722).

If it is determined in the step S722 that the fax number of the communication apparatus 100B which is the sender of the request has not been registered in the communication apparatus information (NO to the step S722), the power rate management server 113 proceeds to a step S724. On the other hand, if it is determined in the step S722 that the fax number of the communication apparatus 100B which is the sender of the request has been registered in the communication apparatus information (YES to the step S722), the power rate management server 113 adds the memory reception-setting time to the communication apparatus information (step S723). Then, the power rate management server 113 sends a memory reception-setting response to the communication apparatus 100B (step S724), followed by terminating the present process.

FIGS. 14A to 14F are diagrams showing examples of screens displayed on the operation panel 111 appearing in FIG. 2.

FIG. 14A shows an example of a memory reception setting screen on which "automatic time setting by the power rate management server" has been set. FIG. 14B shows a screen indicating a time period from start to end, which is displayed when "automatic time setting by the power rate management server" is set.

FIG. 14C shows an example of the memory reception setting screen on which "time setting based on the memory reception-recommended time" is set. FIG. 14D shows a screen indicating a time period from start to end, which is displayed when "time setting based on the memory reception-recommended time" is set. Further, the memory reception time can be changed on this screen.

FIG. 14E shows an example of the memory reception setting screen on which "time setting based on the reception print-recommended time" is set. FIG. 14F shows a screen indicating a time period from start to end, which is displayed when "time setting based on the reception print-recommended time" is set. Further, the reception print time can be changed on this screen.

Figure 15:
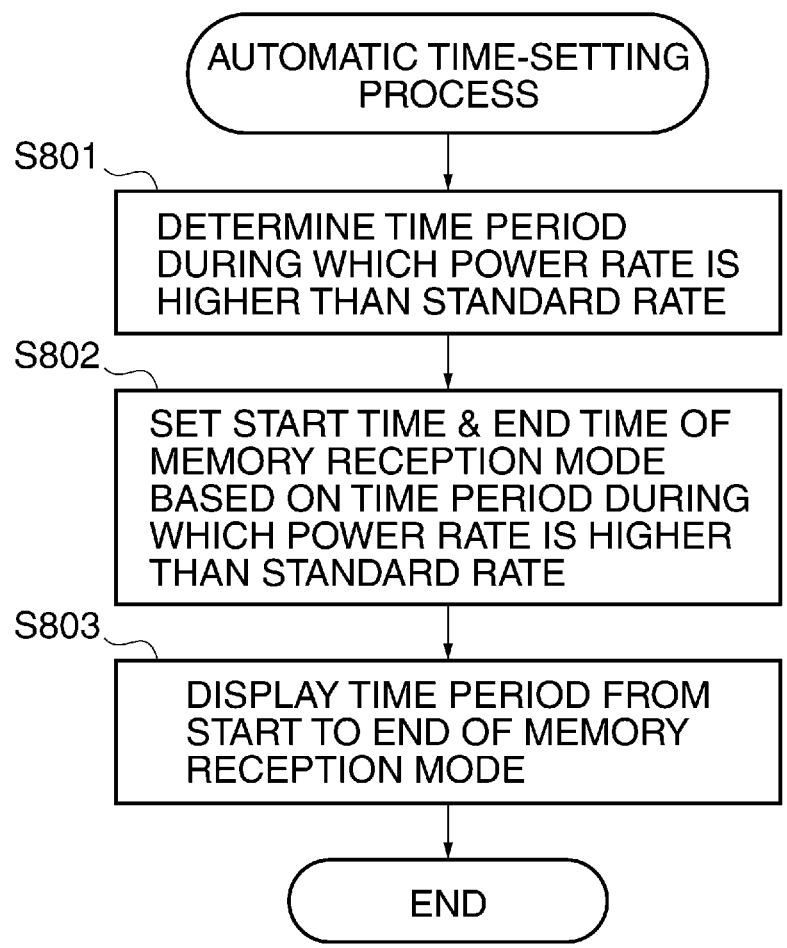
FIG. 15 is a flowchart of an automatic time-setting process executed in a step in FIG. 12.

FIG. 15 is a flowchart of the automatic time-setting process executed in the step S706 in FIG. 12.

Referring to FIG. 15, when "automatic time setting by the power rate management server" has been selected on the memory reception setting screen, the communication apparatus 100B determines a time period during which the power rate is higher than the standard rate, based on the electricity unit price information (step S801).

Next, the communication apparatus 100B sets the start time of the time period during which the power rate is higher than the standard rate as the start time of the memory reception mode, and sets the end time of the same as the end time of the memory reception mode (step S802). Then, the communication apparatus 100B displays the time period from start to end of the memory reception mode (step S803), followed by terminating the present process. In FIG. 14B, the time period from start to end of the memory reception mode is displayed as "07:00-23:00". In the automatic time-setting process, a time period other than the time period during which the power rate indicated in the power rate information is higher than the standard rate is set as the printable time period.

Figure 16:
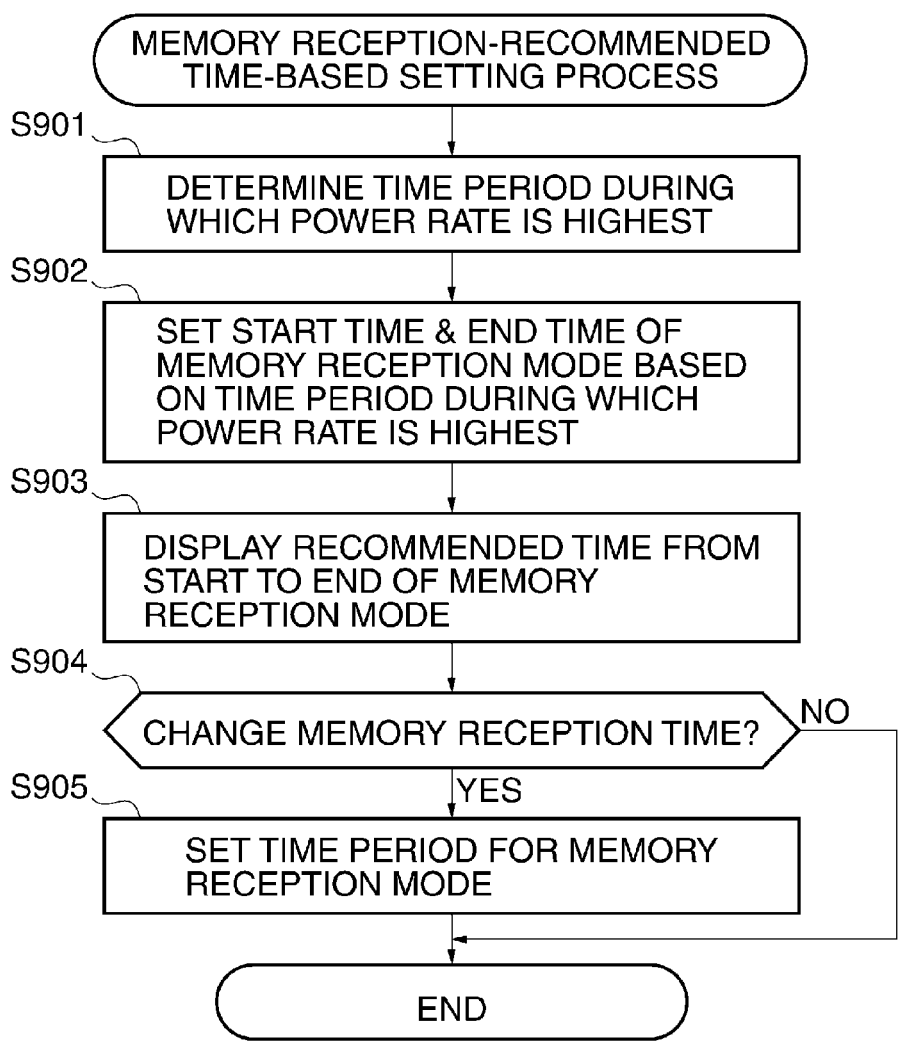
FIG. 16 is a flowchart of a memory reception-recommended time-based setting process executed in a step in FIG. 12.

FIG. 16 is a flowchart of the memory reception-recommended time-based setting process executed in the step S708 in FIG. 12.

Referring to FIG. 16, when "time setting based on the memory reception-recommended time" has been selected on the memory reception setting screen, the communication apparatus 100B determines a time period during which the power rate is highest, based on the electricity unit price information (step S901).

Then, the communication apparatus 100B sets the start time of the time period during which the power rate is highest as the start time of the memory reception mode, and the end time of the same as the end time of the memory reception mode (step S902). Then, the communication apparatus 100B displays a recommended time period from start to end of the memory reception mode (step S903).

For example, to suppress reception print in the time period during which the power rate is highest, "10:00-17:00" is displayed as the recommended time period from start to end of the memory reception mode, as shown in FIG. 14D.

Then, the communication apparatus 100B determines whether or not to change the memory reception time (step S904). If it is determined in the step S904 that the memory reception time is not to be changed (NO to the step S904), the present process is terminated.

On the other hand, if it is determined in the step S904 that the memory reception time is to be changed (YES to the step S904), the communication apparatus 100B sets a time period for the memory reception mode (step S905), followed by terminating the present process. In the step S905, the user can change the time period from start to end of the memory reception by referring to the recommended time. In this memory reception-recommended time-based setting process, a time period other than the time period during which the power rate indicated in the power rate information is highest is set as the printable time period.

Figure 17:
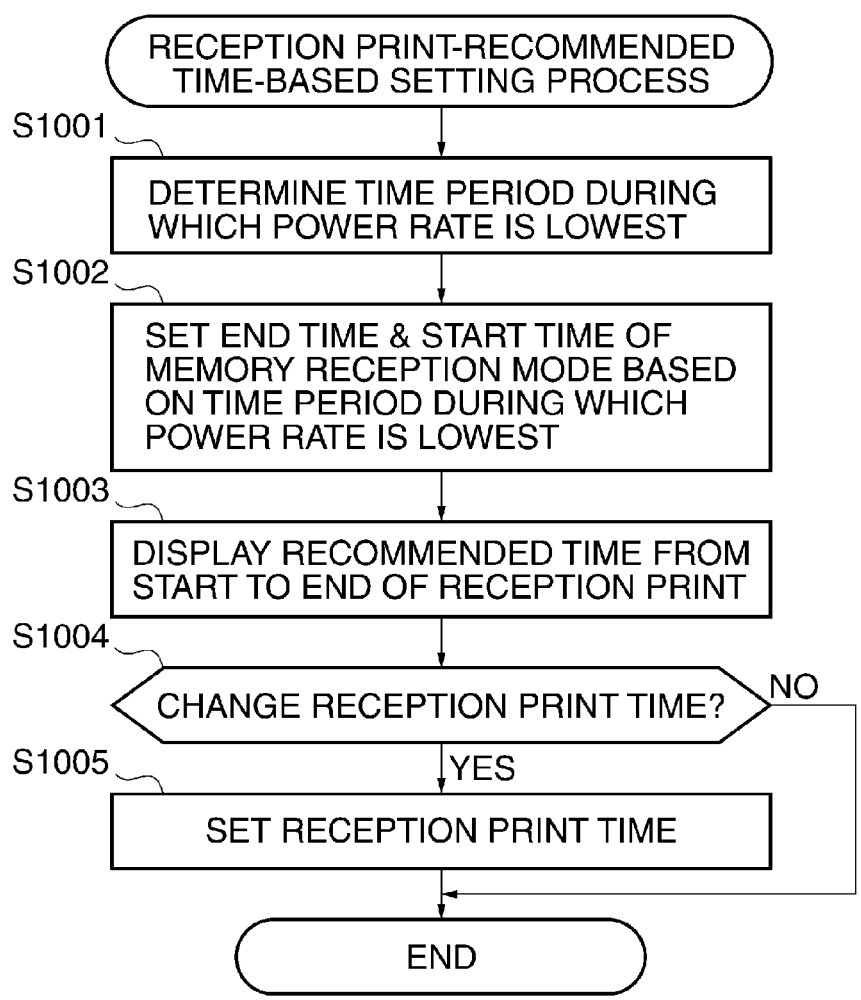
FIG. 17 is a flowchart of a reception print-recommended time-based setting process executed in a step in FIG. 12.

FIG. 17 is a flowchart of the reception print-recommended time-based setting process executed in the step S710 in FIG. 12.

Referring to FIG. 17, when "time setting based on the reception print-recommended time" has been selected on the memory reception setting screen, the communication apparatus 100B determines a time period during which the power rate is lowest, based on the electricity unit price information (step S1001).

Then, the communication apparatus 100B sets the start time of the time period during which the power rate is lowest as the end time of the memory reception mode, and the end time of the same as the start time of the memory reception mode (step S1002).

Then, the communication apparatus 100B displays the recommended time period from start to end of the reception print (step S1003). For example, to recommend the reception print during the time period during which the power rate is lowest, "23:00-07:00 (next day)" is displayed as the recommended time period from start to end of the reception print, as shown in FIG. 14F.

The communication apparatus 100B determines whether or not to change the reception print time (step S1004). If it is determined in the step S1004 that the reception print time is not to be changed (NO to the step S1004), the present process is terminated.

On the other hand, if it is determined in the step S1004 that the reception print time is to be changed (YES to the step S1004), the communication apparatus 100B sets the reception print time (step S1005), followed by terminating the present process. In the step S1004, the user can change the time period from start to end of the reception print by referring to the recommended time period. In this reception print-recommended time-based setting process, the time period during which the power rate indicated in the power rate information is lowest is set as the printable time period.

Figure 18:
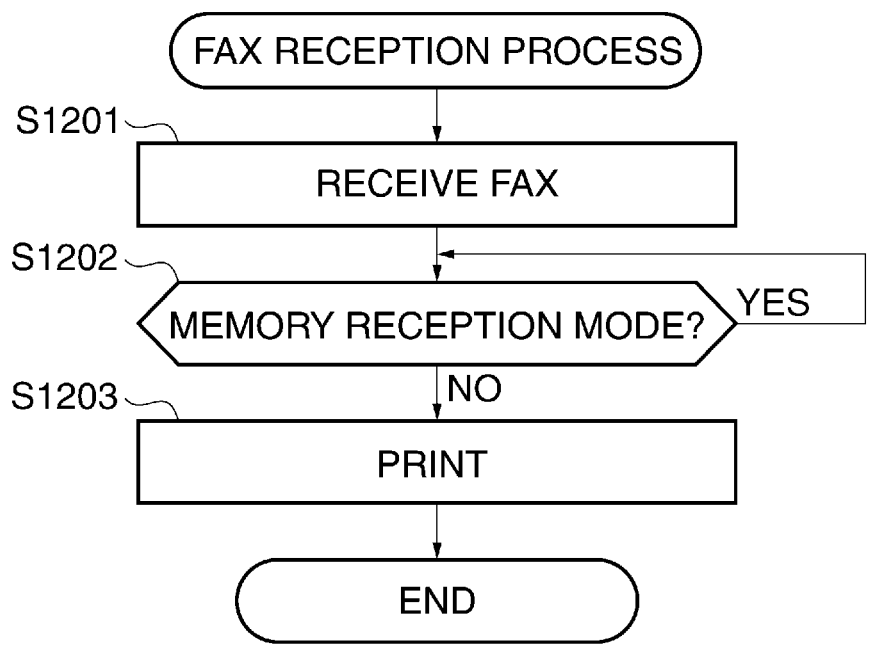
FIG. 18 is a flowchart of a facsimile reception process executed by the CPU of the communication apparatus.

FIG. 18 is a flowchart of a facsimile reception process executed by the CPU 101 of the communication apparatus.

Referring to FIG. 18, the communication apparatus 100B receives a facsimile (step S1201). At this time, an image of the facsimile is stored in the RAM 103. If it is during the memory reception mode (YES to a step S1202), the communication apparatus 100B waits, whereas if it is not during the memory reception mode (NO to the step S1202), the communication apparatus 100B prints the received image (step S1203), followed by terminating the present process. As described above, the print operation is not executed until the memory reception mode is canceled, and when the memory reception mode is canceled, the facsimile received during the memory reception mode is printed. The step S1203 corresponds to an operation of a printing unit configured to print an image, stored in the RAM 103, during a time period other than the forced memory reception time.

Figure 19:
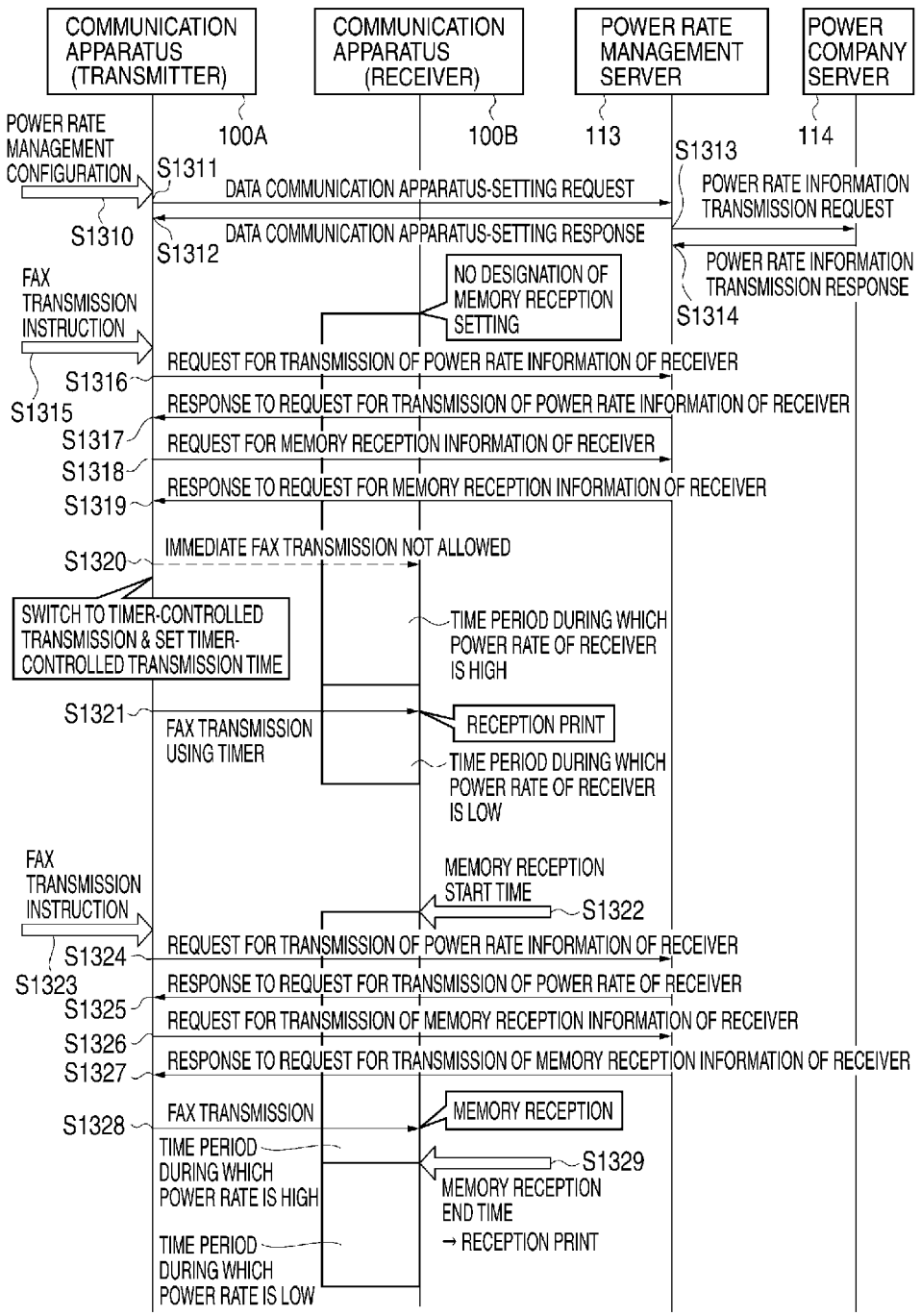
FIG. 19 is a sequence diagram of a facsimile transmission and reception process executed by the communication system.

FIG. 19 is a sequence diagram of a facsimile transmission and reception process executed by the communication system 90 shown in FIG. 1.

FIG. 19 shows an example of the facsimile transmission and reception process in a case where a facsimile is transmitted from the communication apparatus 100A to the communication apparatus 100B.

When the power rate management configuration is performed by inputting the address of the power rate management server 113 (step S1310), the communication apparatus 100A transmits a communication apparatus-setting request to the power rate management server 113 via the network 105 (step S1311). The communication apparatus 100A sends a fax number and an installation location, which have been set in the communication apparatus 100A in advance, to the power rate management server 113 by the communication apparatus-setting request.

Upon receipt of the communication apparatus-setting request, the power rate management server 113 stores the received fax number and installation location as the management information of the communication apparatus 100A, and sets the power company server 114 of an electric power company which manages a district including the received installation location, as a server to be used in association with the request. Then, the power rate management server 113 sends a communication apparatus-setting response to the communication apparatus 100A (step S1312).

Next, the power rate management server 113 regularly sends a power rate information transmission request to the power company server 114 (step S1313). Upon receipt of the power rate information transmission request, the power company server 114 transmits the time-of-day-based electricity unit price information to the power rate management server 113 as a power rate information transmission response (step S1314). Upon receipt of the time-of-day-based electricity unit price information, the power rate management server 113 updates the time-of-day-based electricity unit price and sets the standard rates as the power rate management information.

In the following steps S1315 to S1321, the facsimile transmission process executed in a case where the communication apparatus 100B as the receiver is not in the memory reception mode when the communication apparatus 100A sends a facsimile will be described.

When a fax transmission instruction is provided to the communication apparatus 100A (step S1315), the communication apparatus 100A sends a power rate information transmission request to the power rate management server 113 via the network 105 to acquire the power rate information of the communication apparatus 100B which is a receiver of a facsimile at a receiving end (step S1316). The communication apparatus 100A sends the fax number of the communication apparatus 100B by the power rate information transmission request.

Upon receipt of the power rate information transmission request, the power rate management server 113 transmits the time-of-day-based electricity unit price information of the communication apparatus 100B to the communication apparatus 100A as a power rate information transmission response (step S1317).

Then, the communication apparatus 100A receives the time-of-day-based electricity unit price information of the communication apparatus 100B. Next, to acquire memory reception information of the communication apparatus 100B, the communication apparatus 100A sends a memory reception information transmission request to the power rate management server 113 via the network 105 (step s1318). The communication apparatus 100A sends the fax number of the communication apparatus 100B by the memory reception information transmission request.

Upon receipt of the memory reception information transmission request, the power rate management server 113 transmits the memory reception information of the communication apparatus 100B to the communication apparatus 100A as a memory reception information transmission response (step S1319).

Next, the communication apparatus 100A executes the process for transmitting a facsimile to the communication apparatus 100B which is a receiver of the facsimile (step S1320). However, when the communication apparatus 100B which is the receiver of the facsimile is not in the memory reception mode, but it is during the time period during which the power rate is high, the communication apparatus 100A does not immediately transmit the facsimile so as to save the power consumption of the receiver, and changes the transmission operation to timer-controlled transmission.

Further, the communication apparatus 100A calculates a time period during which the power rate is low for the receiver of the facsimile, and sets the time of the timer-controlled transmission based on a recommended timer-controlled transmission time period. Then, when it is time to transmit the facsimile according to the timer, the communication apparatus 100A transmits the facsimile according to the timer (step S1321).

In the following steps S1322 to S1329, the facsimile transmission process will be described which is executed in a case where the communication apparatus 100B as the receiver of a facsimile is in the memory reception mode when the communication apparatus 100A sends a facsimile.

First, when it becomes the start time of the memory reception, the communication apparatus 100B shifts to the memory reception mode (step S1322).

When a facsimile transmission instruction is provided to the communication apparatus 100A (step S1323), the communication apparatus 100A sends a power rate information transmission request to the power rate management server 113 via the network 105 to acquire the power rate information of the communication apparatus 100B (step S1324). In doing this, the communication apparatus 100A sends the fax number of the communication apparatus 100B.

Upon receipt of the power rate information transmission request, the power rate management server 113 transmits the time-of-day-based electricity unit price information of the communication apparatus 100B to the communication apparatus 100A as a power rate information transmission response (step S1325). Then, the communication apparatus 100A receives the time-of-day-based electricity unit price information of the communication apparatus 100B.

Next, the communication apparatus 100A sends a memory reception information transmission request to the power rate management server 113 via the network 105 to acquire the memory reception information of the communication apparatus 100B (step S1326). In doing this, the communication apparatus 100A sends the fax number of the communication apparatus 100B.

Upon receipt of the memory reception information transmission request, the power rate management server 113 transmits the memory reception information of the communication apparatus 100B to the communication apparatus 100A as a memory reception information transmission response (step S1327).

Next, the communication apparatus 100A executes the process for transmitting a facsimile to the communication apparatus 100B which is the receiver of the facsimile (step S1328). At this time, when the communication apparatus 100B as the receiver is in the memory reception mode, the communication apparatus 100A enables immediate facsimile transmission even during a time period during which the power rate is high.

Then, the communication apparatus 100B as the receiver executes the memory reception process for temporarily storing the received facsimile. Thereafter, when it becomes the end time of the memory reception mode to enter the time period during which the power rate is low, the communication apparatus 100B as the receiver executes the reception print for printing data of the facsimile received during the memory reception mode (step S1329).

Figure 20:
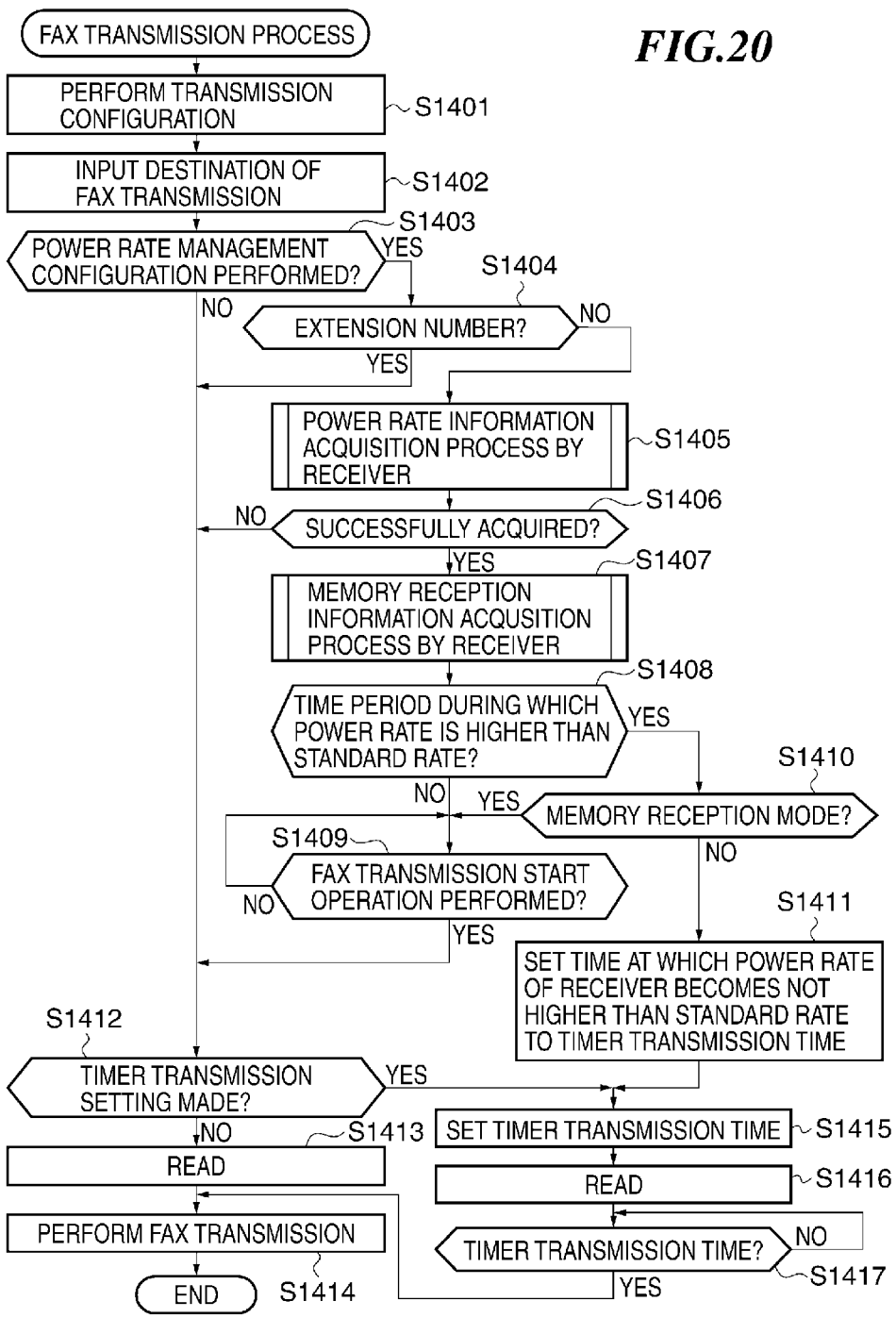
FIG. 20 is a flowchart of a facsimile transmission process executed by the CPU of the communication apparatus.

FIG. 20 is a flowchart of the facsimile transmission process executed by the CPU 101 of the communication apparatus.

The facsimile transmission process in FIG. 20 corresponds to the process executed by the communication apparatus 100A in the example shown in FIG. 19.

Referring to FIG. 10, the user performs transmission configuration for setting image information, such as a resolution and density of data to be transmitted (step S1401), and inputs a destination of facsimile transmission (step S1402).

Next, the communication apparatus 100A determines whether or not the power rate management configuration has been performed (step S1403). If it is determined in the step S1403 that the power rate management configuration has not been performed (NO to the step S1403), the communication apparatus 100A proceeds to a step S1412.

On the other hand, if it is determined in the step S1403 that the power rate management configuration has been performed (YES to the step S1403), the communication apparatus 100A determines whether or not the destination is an extension number (step S1404). For example, when the communication apparatus is connected to an extension switch board, whether or not the destination is an extension number can be determined depending on whether or not a dial 0 call is to be made.

If it is determined in the step S1404 that the destination is an extension number (YES to the step S1404), the communication apparatus 100A proceeds to the step S1412. On the other hand, if it is determined in the step S1404 that the destination is not an extension number (NO to the step S1404), the communication apparatus 100A acquires the power rate information of the destination by executing the power rate information acquisition process described with reference to FIG. 10 (step S1405). The step S1405 corresponds to an operation of a first acquisition unit configured, in a case where a facsimile is transmitted, to acquire power rate information which indicates a plurality of power rates, time periods to which the plurality of power rates are applied, respectively, and a standard power rate which is a power rate used as a reference, and is applied to a destination communication apparatus which is a receiver of the facsimile.

Then, the communication apparatus 100A determines whether or not the power rate information has been successfully acquired (step S1406). If it is determined in the step S1406 that the power rate information has not been successfully acquired (NO to the step S1406), the communication apparatus 100A proceeds to the step S1412.

On the other hand, if it is determined in the step S1406 that the power rate information has been successfully acquired (NO to the step S1406), the communication apparatus 100A executes a memory reception information acquisition process for acquiring memory reception-set time periods of the destination communication apparatus 100B from the power rate management server 113 (step S1407). The memory reception information acquisition process will be described hereinafter.

Next, the communication apparatus 100A determines whether or not the current time is included in a time period during which the power rate of the destination communication apparatus 100B is higher than the standard rate (step S1408). The step S1408 corresponds to an operation of a first determination unit configured to determine whether or not the current time is included in a high power rate time period during which the power rate is higher than the standard power rate, using the acquired power rate information.

If it is determined in the step S1408 that the current time is not included in a time period during which the power rate is higher than the standard rate (NO to the step S1408), the communication apparatus 100A waits for a fax transmission starting operation, and when the fax transmission start operation is performed (YES to a step S1409), the communication apparatus 100A proceeds to the step S1412.

On the other hand, if the current time is not included in a time period during which the power rate is higher than the standard rate (YES to the step S1408), the communication apparatus 100A determines whether or not the communication apparatus 100B as the receiver is in the memory reception mode (step S1410).

If it is determined in the step S1410 that the communication apparatus 100B as the receiver is in the memory reception mode at the present time (YES to the step S1410), the communication apparatus 100A proceeds to the step S1409. The step S1410 corresponds to an operation of a second determination unit configured to determine whether or not the current time is included in the memory reception time period. The memory reception time period is a time period during which the communication apparatus is in the memory reception mode.

On the other hand, if it is determined in the step S1410 that communication apparatus 100B as the receiver is not in the memory reception mode (NO to the step S1410), the communication apparatus 100A determines a time at which the power rate of the receiver becomes not higher than the standard rate as the timer-controlled transmission time (step S1411).

Next, the communication apparatus 100A sets the time at which the power rate of the receiver becomes not higher than the standard rate as the timer-controlled transmission time (step S1415), reads an original (step S1416), and acquires the current time from the RTC 112, and when it becomes the timer-controlled transmission time (step S1417), the communication apparatus 100A performs transmission of the facsimile (step S1414), followed by terminating the present process.

Referring again to the step S1412, in this step, the communication apparatus 100A determines whether or not the timer-controlled transmission setting has been made (step S1412). If it is determined in the step S1412 that the timer-controlled transmission setting has been made (YES to the step S1412), the communication apparatus 100A sets the time set in the timer-controlled transmission setting (step S1415), and proceeds to the step S1416.

On the other hand, if it is determined in the step S1412 that the timer-controlled transmission setting has not been made (NO to the step S1412), the communication apparatus 100A reads the original (step S1413), and performs transmission of the facsimile (step S1414), followed by terminating the present process.

As described above, in the process in FIG. 20, when it is determined that the current time is included in the high-power rate time period and also it is determined that the current time is not included in the memory reception time period, only after the high-power rate time period ends, a facsimile is transmitted. The step S1414 corresponds to an operation of a transmission unit.

Figure 21:
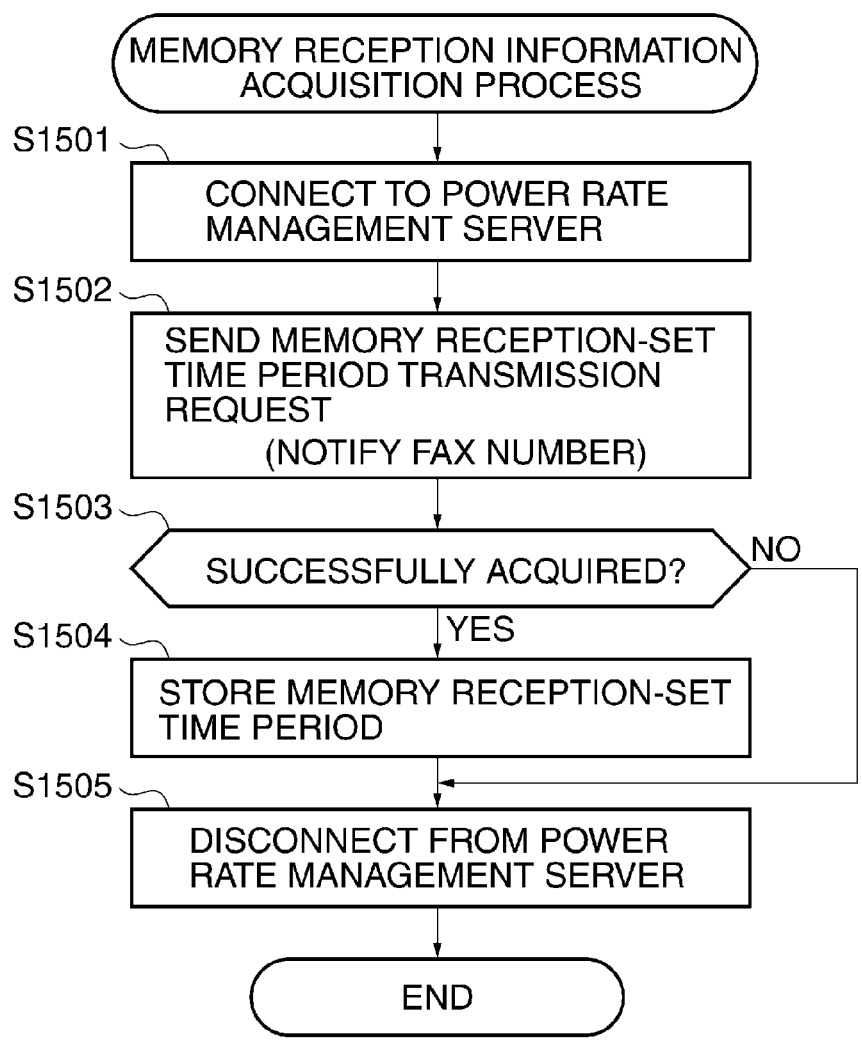
FIG. 21 is a flowchart of a memory reception information acquisition process executed in a step in FIG. 20.

FIG. 21 is a flowchart of the memory reception information acquisition process executed in the step S1407 in FIG. 20.

Referring to FIG. 21, the communication apparatus 100A connects to the power rate management server 113 (step S1501) to send a request for acquiring the memory reception-set time period of the communication apparatus 100B as the receiver (step S1502). In doing this, the communication apparatus 100A transmits the fax number of the communication apparatus 100B as the receiver.

Next, the communication apparatus 100A determines whether or not the memory reception-set time period of the communication apparatus 100B as the receiver has been successfully acquired (step S1503). If it is determined in the step S1503 that the memory reception-set time period of the communication apparatus 100B as the receiver has not been successfully acquired (NO to the step S1503), the communication apparatus 100A proceeds to a step S1505.

On the other hand, if it is determined in the step S1503 that the memory reception-set time period of the communication apparatus 100B as the receiver has been successfully acquired (YES to the step S1503), the communication apparatus 100A stores the memory reception-set time period (step S1504), and disconnects from the power rate management server 113 (step S1505), followed by terminating the present process.

This memory reception information acquisition process corresponds to an operation of a second acquisition unit configured to acquire a memory reception time period which is a time period during which when a facsimile is received by the destination communication apparatus, the facsimile is not printed but stored in a storage section.

Figure 22:
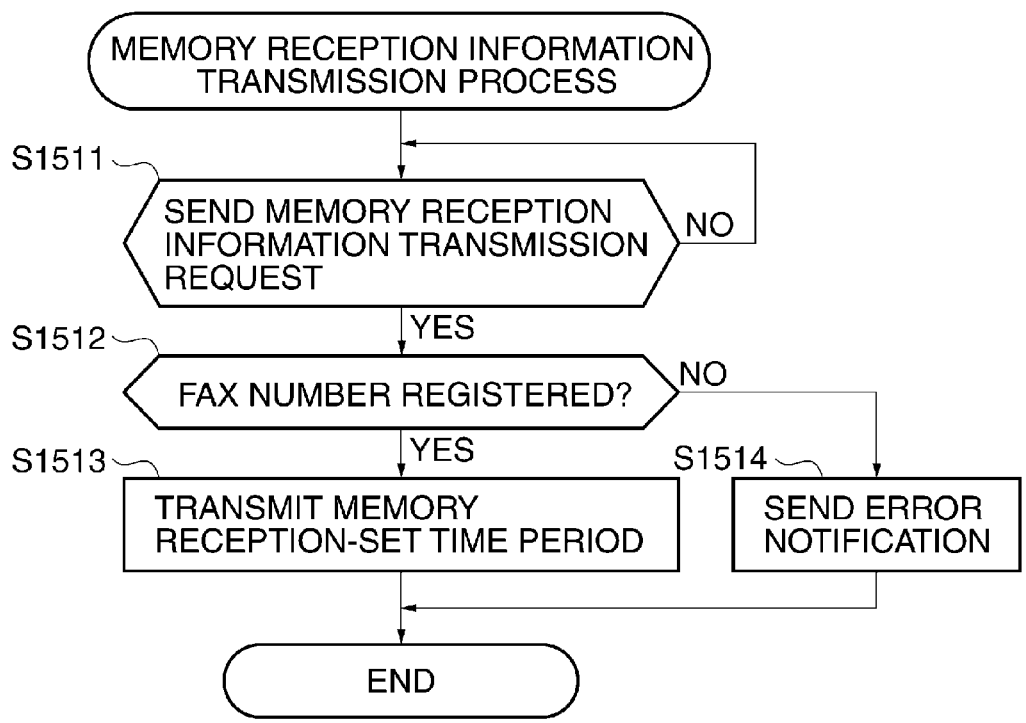
FIG. 22 is a flowchart of a memory reception information transmission process executed by the CPU of the power rate management server.

FIG. 22 is a flowchart of a memory reception information transmission process executed by the CPU 1 of the power rate management server 113.

Referring to FIG. 22, when the power rate management server 113 receives a memory reception-set time period transmission request (YES to a step S1511), the power rate management server 113 determines whether or not the received fax number has been registered in the communication apparatus information (step S1512). If it is determined in the step S1512 that the received fax number has been registered in the communication apparatus information (YES to the step S1512), the power rate management server 113 transmits the memory reception-set time period (step S1513).

On the other hand, if it is determined in the step S1512 that the received fax number has not been registered in the communication apparatus information (NO to the step S1512), the power rate management server 113 sends an error notification to the communication apparatus 100 (step S1514), followed by terminating the present process.

In the above-described embodiment, using the power rate information, the printable time period is set which is a time period during which a power rate costing to print a facsimile is lower than in a case where no restriction is provided on a time period during which an image received by fax can be printed. Then, in a case where an image is received by fax in a time period other than the set printable time period, the image is stored in a storage section and the image stored in the storage section is printed during the printable time period. This makes it possible to reduce the power consumption of the communication apparatus, compared with the case where no restriction is provided on the time period during which an image received by fax can be printed.

Further, in the present embodiment, the power rate information indicative of the time-of-day-based electricity unit prices and the standard rate is acquired, and one of a time period during which the power rate is not lower than the standard rate, a time period during which the unit price of the power rate is highest, and a time period other than a time period during which the unit price of the power rate is lowest, is set as the memory reception time.

According to this setting, when it becomes a time period during which the power rate is high, the communication apparatus shifts to the memory reception mode in which when a facsimile is received, image data received by fax is not immediately printed but temporarily stored in the RAM 103. Then, when it becomes a time period during which the power rate is low, the memory reception mode is canceled and the image received during the memory reception mode is allowed to be printed.

In transmitting a facsimile, by acquiring the power rate information and the memory reception information of the receiver of the facsimile, when it is during the time period during which the power rate of the receiver is higher than the standard rate and the receiver of the facsimile is in the memory reception mode, the facsimile is immediately transmitted. Further, when the receiver of the facsimile is not in the memory reception mode, the facsimile can be transmitted at a time when the power rate of the receiver becomes lower than the standard rate by using a timer.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2012-268232, filed Dec. 7, 2012, which is hereby incorporated by reference herein in its entirety.

What is claimed is:
1. A communication apparatus comprising:
a first acquisition unit configured to acquire power rate information which indicates a plurality of power rates, and time periods to which the plurality of power rates are applied, respectively the plurality of power rates being applied to a destination communication apparatus which is a receiver of a facsimile;

a second acquisition unit configured to acquire a memory reception time period which is a time period during which when a facsimile is received by the destination communication apparatus, the facsimile is not printed but stored in a storage section;

a first determination unit configured to determine whether or not the current time is included in a high power rate time period during which the power rate is higher than a standard power rate, using the power rate information acquired by said first acquisition unit;

a second determination unit configured to determine whether or not the current time is included in the memory reception time period acquired by said second acquisition unit; and a transmission unit configured to transmit a facsimile after an end of the high power rate time period, in a case where it is determined by said first determination unit that the current time is included in the high power rate time period and it is determined by said second determination unit that the current time is not included in the memory reception time period.

2. A method of controlling a communication apparatus, comprising:

acquiring power rate information which indicates a plurality of power rates, and time periods to which the plurality of power rates are applied, respectively, the plurality of power rates being applied to a destination communication apparatus which is a receiver of a facsimile;

acquiring a memory reception time period which is a time period during which when a facsimile is received by the destination communication apparatus, the facsimile is not printed but stored in a storage section;

determining whether or not the current time is included in a high power rate time period during which the power rate is higher than a standard power rate, using the power rate information acquired by said first-mentioned acquiring;

determining whether or not the current time is included in the memory reception time period acquired by said second-mentioned acquiring; and transmitting a facsimile after an end of the high power rate time period, in a case where it is determined by said first-mentioned determining that the current time is included in the high power rate time period and it is determined by said second-mentioned determining that the current time is not included in the memory reception time period.

3. A non-transitory computer-readable storage medium storing a computer-executable program for causing a computer to execute a method of controlling a communication apparatus, wherein the method comprises:

acquiring power rate information which indicates a plurality of power rates, and time periods to which the plurality of power rates are applied, respectively, the plurality of power rates being applied to a destination communication apparatus which is a receiver of a facsimile;

acquiring a memory reception time period which is a time period during which when a facsimile is received by the destination communication apparatus, the facsimile is not printed but stored in a storage section;

determining whether or not the current time is included in a high power rate time period during which the power rate is higher than a standard power rate, using the power rate information acquired by said first-mentioned acquiring;

determining whether or not the current time is included in the memory reception time period acquired by said second-mentioned acquiring; and transmitting a facsimile after an end of the high power rate time period, in a case where it is determined by said first-mentioned determining that the current time is included in the high power rate time period and it is determined by said second-mentioned determining that the current time is not included in the memory reception time period.

4. The communication apparatus according to claim 1, wherein said first acquisition unit is configured to acquire the power rate information in response to receipt of an instruction for transmitting the facsimile to the destination communication apparatus.

5. The communication apparatus according to claim 1, wherein said second acquisition unit is configured to acquire the memory reception time period in response to receipt of an instruction for transmitting the facsimile to the destination communication apparatus.

6. The communication apparatus according to claim 1, further comprising a setting unit configured to set as a time period when said transmission unit transmits the facsimile, a time period after an end of the high power rate time period, in a case where it is determined by said first determination unit that the current time is included in the high power rate time period and it is determined by said second determination unit that the current time is not included in the memory reception time period.

7. The communication apparatus according to claim 1, wherein said transmission unit is configured to transmit the facsimile in response to receipt of an instruction for transmitting the facsimile to the destination communication apparatus, in a case where it is determined by said first determination unit that the current time is not included in the high power rate time period.

8. The communication apparatus according to claim 1, wherein said transmission unit is configured to transmit the facsimile in response to receipt of an instruction for transmitting the facsimile to the destination communication apparatus, in a case where it is determined by said second determination unit that the current time is not included in the memory reception time period.

* * * * *